US010407005B2

(12) United States Patent
Aoki

(10) Patent No.: US 10,407,005 B2
(45) Date of Patent: Sep. 10, 2019

(54) VEHICLE POWER SUPPLY CONTROL DEVICE

(71) Applicant: Yazaki Corporation, Tokyo (JP)

(72) Inventor: Yoshihito Aoki, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 104 days.

(21) Appl. No.: 15/641,433

(22) Filed: Jul. 5, 2017

(65) Prior Publication Data
US 2018/0015892 A1    Jan. 18, 2018

(30) Foreign Application Priority Data
Jul. 13, 2016    (JP) .................................. 2016-138423

(51) Int. Cl.
| | |
|---|---|
| H02J 7/00 | (2006.01) |
| B60R 16/033 | (2006.01) |
| B60R 16/03 | (2006.01) |
| H02J 1/10 | (2006.01) |
| H02J 1/00 | (2006.01) |

(52) U.S. Cl.
CPC ............ B60R 16/033 (2013.01); B60R 16/03 (2013.01); H02J 1/10 (2013.01); H02J 7/0052 (2013.01); *H02J 2001/008* (2013.01)

(58) Field of Classification Search
CPC .......... B60R 16/033; B60R 16/03; H02J 1/10; H02J 7/0052; H02J 2001/008
USPC ......................................................... 307/9.1
See application file for complete search history.

(56) References Cited

U.S. PATENT DOCUMENTS

| | | | |
|---|---|---|---|
| 6,639,384 B2 | 10/2003 | Hasegawa et al. | |
| 9,217,781 B2* | 12/2015 | Tabatowski-Bush | ........................ H01M 10/482 |
| 9,669,723 B2* | 6/2017 | Sugeno | ................. B60L 3/0046 |
| 9,849,793 B2* | 12/2017 | Tashiro | ................. H02J 7/0029 |
| 2002/0140397 A1 | 10/2002 | Hasegawa et al. | |
| 2019/0018070 A1* | 1/2019 | Yamada | ............... G01R 31/389 |

FOREIGN PATENT DOCUMENTS

| | | |
|---|---|---|
| JP | 2002305843 A | 10/2002 |
| JP | 2008017593 A | 1/2008 |
| JP | 2011-130641 A | 6/2011 |
| JP | 2013-042563 A | 2/2013 |
| JP | 2014-147197 A | 8/2014 |
| JP | 2014151873 A | 8/2014 |

(Continued)

OTHER PUBLICATIONS

Communication dated Nov. 6, 2018, from the Japanese Patent Office in counterpart application No. 2016-138423.

(Continued)

*Primary Examiner* — Dinh T Le
(74) *Attorney, Agent, or Firm* — Sughrue Mion, PLLC

(57) ABSTRACT

The vehicle power supply control device includes a vehicle power supply master and an area power supply master. The vehicle power supply master supplies power charged in a main battery to the area power supply master. The area power supply master supplies power charged in an area battery to each load. The area power supply master supplies, to the load, at least either of the following: power supplied from the vehicle power supply master; and power charged in the area battery.

23 Claims, 21 Drawing Sheets

(56) References Cited

FOREIGN PATENT DOCUMENTS

JP    2015150958 A    8/2015

OTHER PUBLICATIONS

Communication dated Jul. 31, 2018, from Japanese Patent Office in counterpart application No. 2016-138423.
Communication dated May 14, 2019, from the Japanese Patent Office in counterpart application No. 2016-138423.

* cited by examiner

VEHICLE POWER SUPPLY CONTROL DEVICE

CROSS-REFERENCE TO RELATED APPLICATION(S)

The present application claims priority to and incorporates by reference the entire contents of Japanese Patent Application No. 2016-138423 filed in Japan on Jul. 13, 2016.

BACKGROUND OF THE INVENTION

1. Field of the Invention

The present invention relates to a vehicle power supply control device.

2. Description of the Related Art

Conventionally, a vehicle power supply control device has been used to supply power stored in a battery to on-vehicle equipment. For example, a vehicle power supply control device includes a power supply box, and a battery is connected to a plurality of pieces of equipment via the power supply box. The power supply box supplies power stored in the battery to each piece of equipment (for example, Japanese Patent Application Laid-open No. 2013-42563).

Such a vehicle power supply control device has room for improvement in terms of stable supply of power to each piece of on-vehicle equipment via a power supply box.

SUMMARY OF THE INVENTION

The present invention has been made in view of the above-described situation, and is aimed at providing a vehicle power supply control device capable of stably supplying power to each piece of on-vehicle equipment.

In order to achieve the above mentioned object, a vehicle power supply control device according to one aspect of the present invention includes an area power supply controller that is connected to a power-consuming load installed on a vehicle and includes a subsidiary power storage device to be charged and discharged, the area power supply controller being configured to supply power charged in the subsidiary power storage device to the load; and a master power supply controller that is connected to the area power supply controller and includes a main power storage device to be charged and discharged, the master power supply controller being configured to supply power charged in the main power storage device to the area power supply controller, wherein the area power supply controller supplies, to the load, at least either of the following: power supplied from the master power supply controller, and power charged in the subsidiary power storage device.

According to another aspect of the present invention, in the vehicle power supply control device, it is preferable that when the master power supply controller is unable to supply power to the area power supply controller, the area power supply controller supplies power charged in the subsidiary power storage device to the load.

According to still another aspect of the present invention, in the vehicle power supply control device, it is preferable that the area power supply controller supplies power charged in the subsidiary power storage device to the load when the subsidiary power storage device has a value of a state of charge greater than or equal to a set value previously determined, and the area power supply controller does not supply power charged in the subsidiary power storage device when the subsidiary power storage device has a value of the state of charge less than the set value.

According to still another aspect of the present invention, in the vehicle power supply control device, it is preferable that the vehicle power supply control device includes a plurality of the area power supply controllers, and depending on a situation, the master power supply controller performs control so as to supply power charged in the subsidiary power storage device of a first one of the area power supply controllers to the load connected to a second one of the area power supply controllers.

According to still another aspect of the present invention, in the vehicle power supply control device, it is preferable that when power charged in the subsidiary power storage device of the second area power supply controller is unable to be supplied to the load connected to the second area power supply controller, the master power supply controller performs control so as to supply power charged in the subsidiary power storage device of the first area power supply controller to the load connected to the second area power supply controller.

According to still another aspect of the present invention, in the vehicle power supply control device, it is preferable that on conditions that the master power supply controller is able to supply power to the area power supply controller and that the subsidiary power storage device thereof has a value of the state of charge greater than or equal to the set value, the area power supply controller preferentially supplies power charged in the subsidiary power storage device thereof to the load.

According to still another aspect of the present invention, in the vehicle power supply control device, it is preferable that the vehicle power supply control device includes a plurality of the area power supply controllers, and on condition that a first one of the area power supply controllers has requested charging, the master power supply controller charges the subsidiary power storage device of the first area power supply controller with at least either of the following: power supplied from the master power supply controller, and power charged in the subsidiary power storage device of a second one of the area power supply controllers.

According to still another aspect of the present invention, in the vehicle power supply control device, it is preferable that a power generating device that generates power is connected to the area power supply controller not via the master power supply controller, and the area power supply controller charges the subsidiary power storage device thereof with power generated by the power generating device.

According to still another aspect of the present invention, in the vehicle power supply control device, it is preferable that the area power supply controller includes a power controller configured to control power supplied from the master power supply controller and power charged in the subsidiary power storage device, and a housing in which the subsidiary power storage device and the power controller are accommodated.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following describes forms (embodiments) for carrying out the present invention in detail with reference to the drawings. Descriptions in the following embodiments are not intended to limit the present invention. Components described below include a component that is easily conceivable by those skilled in the art and/or components that are substantially the same as each other. The components described below can be appropriately combined. The components can be omitted, replaced, or changed variously without departing from the gist of the present invention.

First Embodiment

Figure 1:
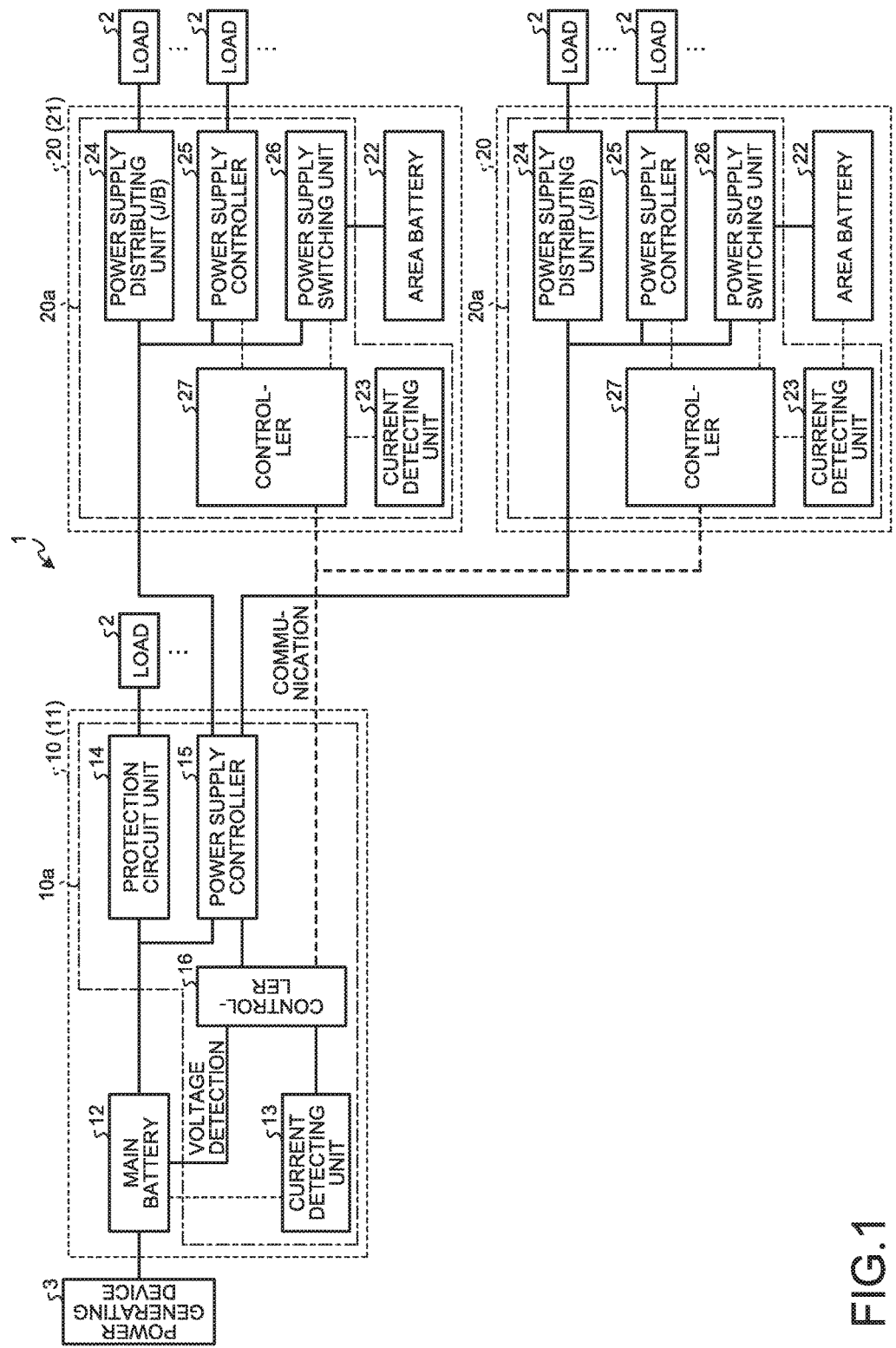
FIG. 1 is a block diagram illustrating an exemplary configuration of a vehicle power supply control device according to a first embodiment.
Figure 2:
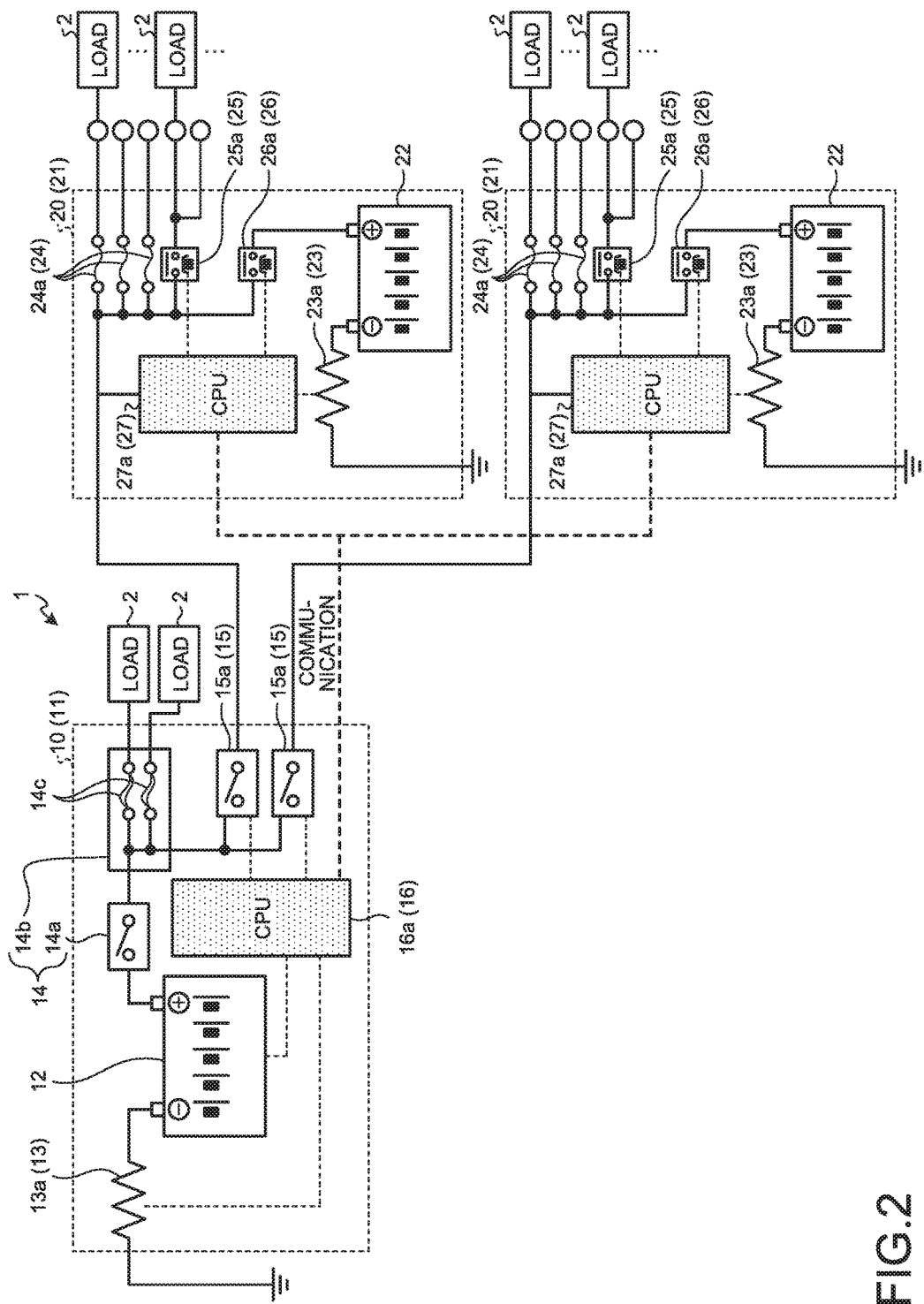
FIG. 2 is a block diagram illustrating the exemplary configuration of the vehicle power supply control device according to the first embodiment.

A vehicle power supply control device according to a first embodiment is described. As illustrated in FIG. 1 and FIG. 2, a vehicle power supply control device 1 is installed in a vehicle (not illustrated) and is configured to supply power to a plurality of loads 2 mounted on the vehicle. The vehicle power supply control device 1 is described in detail hereinbelow.

The vehicle power supply control device 1 includes a vehicle power supply master 10 and area power supply masters 20. The vehicle power supply master 10 is a master power supply controller, and is configured to supply power charged in a main battery 12 (described later) to the loads 2. For example, the vehicle power supply master 10 supplies power charged in the main battery 12 to each load 2 via a corresponding one of the area power supply masters 20 or supplies power charged in the main battery 12 to each load 2 not via any of the area power supply masters 20. The vehicle power supply master 10 includes a power controller 10a, a housing 11, and the main battery 12. The power controller 10a is configured to control power with which the main battery 12 is charged and discharged, and includes a current detecting unit 13, a protection circuit unit 14, a power supply controller 15, and a controller 16. The vehicle power supply master 10 has the power controller 10a and the main battery 12 accommodated in the housing 11, for example. The vehicle power supply master 10 is installed in, for example, an engine compartment of the vehicle with various electronic parts of the power controller 10a accommodated in the housing 11. The vehicle power supply control device 1 thus allows for easy installation of the vehicle power supply master 10. The vehicle power supply master 10 may have the main battery 12 installed outside the housing 11.

The main battery 12 is a main power storage device, and is configured to charge and discharge. Examples of the main battery 12 include various rechargeable batteries such as a lead battery, a nickel-hydrogen battery, and a lithium-ion battery. The main battery 12 is a battery having a larger capacity than that of an area battery 22 described later. The main battery 12 may have the same capacity as the area battery 22 or may have a smaller capacity than that of the area battery 22. The main battery 12 is connected to, for example, a power generating device 3 such as an alternator (not illustrated), and is charged with power generated by the power generating device 3.

The current detecting unit 13 is connected to the main battery 12 and configured to detect current that flows into and from the main battery 12. For example, the current detecting unit 13 includes a shunt resistor 13a and detects current for charging or discharging of the main battery 12. Specifically, the current detecting unit 13 detects current from voltage that is proportional to the current and generated by the resistance of the shunt resistor 13a.

The protection circuit unit 14 is a circuit that protects the loads 2. The protection circuit unit 14 is interposed between the main battery 12 and the load 2 that is connected to the vehicle power supply master 10, and is configured to protect a circuit from the main battery 12 to the load 2. The protection circuit unit 14 includes a shut-off circuit 14a and a protection circuit 14b. The shut-off circuit 14a includes a switch and is connected to the main battery 12. The shut-off circuit 14a turns the switch on and off to control on/off of current that flows from the main battery 12 to the loads 2. For example, when overcurrent flows from the main battery 12 into the loads 2, the shut-off circuit 14a turns the switch off to shut off the current. The protection circuit 14b includes a plurality of fuses 14c and is connected to the shut-off circuit 14a. When overcurrent flows from the main battery 12 to the loads 2, the protection circuit 14b protects the circuit by having the fuses 14c melted.

The power supply controller 15 is configured to control current that flows from the main battery 12 to each of the area power supply masters 20. The power supply controller 15 includes shut-off circuits 15a. The shut-off circuits 15a include a plurality of switches and are connected to the plurality of area power supply masters 20 via the respective switches. The shut-off circuits 15a turn the respective switches on and off to control on/off of current that flows from the main battery 12 to the corresponding area power supply masters 20.

The controller 16 is configured to monitor the state of the main battery 12 and control the power supply controller 15. The controller 16 includes a central processing unit (CPU) 16a. The CPU 16a is connected to the shunt resistor 13a and determines the state of charge (charged amount) of the main battery 12 based on a voltage value of the main battery 12 and a current value for the main battery 12 that is detected by the shunt resistor 13a. The CPU 16a is connected to the shut-off circuits 15a of the power supply controller 15 to control the shut-off circuits 15a. For example, the CPU 16a turns the individual switches of the shut-off circuits 15a based on the state of charge of the main battery 12. In this manner, based on the state of charge of the main battery 12, the CPU 16a can control power to be distributed from the main battery 12 to the individual area power supply masters 20. The CPU 16a is connected to each of the area power supply masters 20 through a communication line and exchanges signals with the area power supply master 20.

An exemplary configuration of each of the area power supply masters 20 is described next. The area power supply master 20 is an area power supply controller and configured to supply, to a plurality of loads 2, at least either of power supplied from the vehicle power supply master 10 and power charged in the area battery 22 described later. The area power supply master 20 includes a power controller 20a, a housing 21, and the area battery 22. The power controller 20a is configured to control power supplied from the vehicle power supply master 10 and power charged in the area battery 22. The power controller 20a includes a current detecting unit 23, a power supply distributing unit (J/B) 24, a power supply controller 25, a power supply switching unit 26, and a controller 27. In the area power supply master 20, the power controller 20a and the area battery 22 are accommodated in the housing 21, for example. The area power supply master 20 is installed in, for example, the inside of a front door or rear door of the vehicle with the housing 21 having various electronic parts of the power controller 20a therein. The vehicle power supply control device 1 thus allows for easy installation of the area power supply master 20. The vehicle power supply control device 1 has the area battery 22 accommodated in the housing 21, thereby making it possible to reduce the amount of electric cables used for connecting the area battery 22 and to run those electric cables with ease. The area power supply master 20 may have the area battery 22 installed outside the housing 21. In the first embodiment, a plurality of area power supply masters 20 are installed, specifically, two such area power supply masters 20 are installed. The respective area power supply masters 20 are installed in corresponding vehicle sections defined in accordance with the assembly structure of the vehicle.

However, this example is not limiting.

The area battery 22 is a subsidiary rechargeable battery and is configured to be charged and discharged. Examples of the area battery 22 include various rechargeable batteries such as a lead battery, a nickel-hydrogen battery, and a lithium-ion battery. The area battery 22 is provided to each of the area power supply masters 20.

The current detecting unit 23 is connected to the area battery 22 and configured to detect current that flows into and from the area battery 22. For example, the current detecting unit 23 includes a shunt resistor 23a, thereby being configured to detect current for charging or discharging of the area battery 22. Specifically, the current detecting unit 23 detects current from voltage that is proportional to the current and generated by the resistance of the shunt resistor 23a.

The power supply distributing unit 24 is configured to distribute power to the loads 2 from both or either of the main battery 12 and the area battery 22. For example, the power supply distributing unit 24 includes a plurality of fuses 24a, and has the two or more loads 2 connected thereto via the respective fuses 24a. When overcurrent flows through the loads 2, the power supply distributing unit 24 protects a circuit by having the fuses 24a melted and blown.

The power supply controller 25 is configured to supply, to the loads 2, power supplied from both or either of the main battery 12 and the area battery 22. The power supply controller 25 includes a relay contact 25a, for example, and has a plurality of loads 2, different from the loads 2 connected to the power supply distributing unit 24, connected thereto via the relay contact 25a. That is, each of the area power supply masters 20 has the loads 2 connected via the corresponding power supply distributing unit 24 or the power supply controller 25. The power supply controller 25 turns the relay contact 25a on by having the coil of the relay contact 25a energized, thereby supplying power to the loads 2. The power supply controller 25 turns the relay contact 25a off by having the coil of the relay contact 25a de-energized, thereby stopping power from being supplied to the loads 2.

The power supply switching unit 26 is configured to switch supply of power charged in the area battery 22. The power supply switching unit 26 includes a relay contact 26a and is connected to the power supply distributing unit 24 and the power supply controller 25 via the relay contact 26a. The power supply switching unit 26 turns the relay contact 26a on by having the coil of the relay contact 26a energized, thereby supplying power charged in the area battery 22 to the loads 2 via the power supply distributing unit 24 and the power supply controller 25. The power supply switching unit 26 turns the relay contact 26a off by having the coil of the relay contact 26a de-energized, thereby preventing power charged in the area battery 22 from being supplied to the loads 2 via the power supply distributing unit 24 and the power supply controller 25. When power (output voltage)

supplied from the main battery 12 and power (output voltage) supplied from the area battery 22 have different power supply characteristics, the power supply switching unit 26 equalizes those power supply characteristics.

The controller 27 is configured to monitor the state of the area battery 22 and control the power supply controller 25 and the power supply switching unit 26. The controller 27 includes a CPU 27a. The CPU 27a is connected to a shunt resistor 23a and determines the state of charge of the area battery 22 based on a voltage value of the area battery 22 and a current value for the area battery 22 that is detected by the shunt resistor 23a.

The CPU 27a energizes the coil of the relay contact 26a of the power supply switching unit 26 to turn the relay contact 26a on, and de-energizes the coil of the relay contact 26a to turn the relay contact 26a off. For example, the CPU 27a turns the relay contact 26a based on the state of charge of the area battery 22. In this manner, based on the state of charge of the area battery 22, the CPU 27a controls power to be supplied to the loads 2 from the area battery 22. The CPU 27a controls on/off of the relay contact 25a of the power supply controller 25 to control power to be supplied to the loads 2 connected via the power supply controller 25. The CPU 27a is connected to the vehicle power supply master 10 through a communication line and exchanges signals with the vehicle power supply master 10.

First Exemplary Operation: Processing to Charge Area Battery

Figure 3:
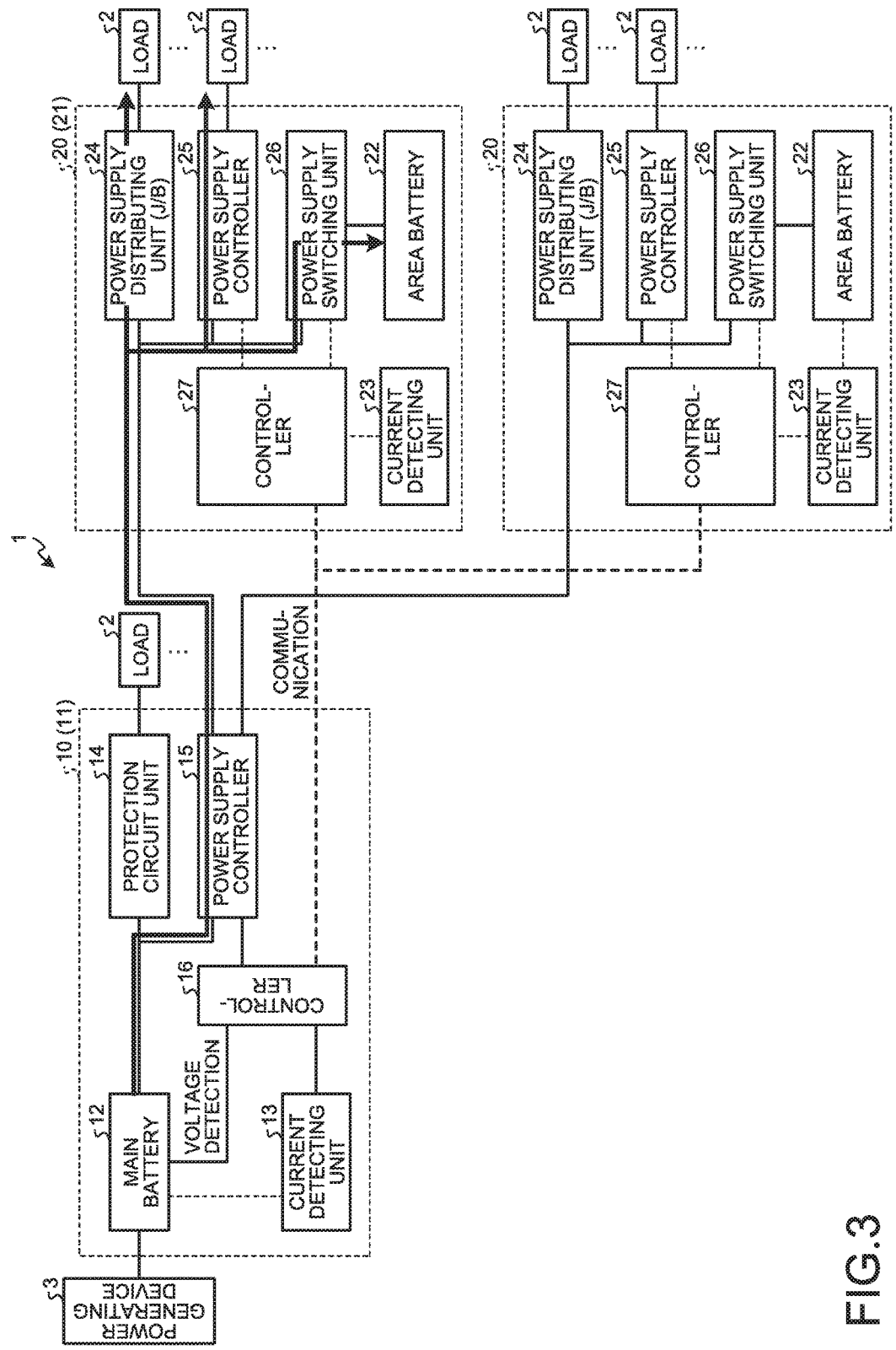
FIG. 3 is a diagram illustrating exemplary first operation of the vehicle power supply control device according to the first embodiment.
Figure 4:
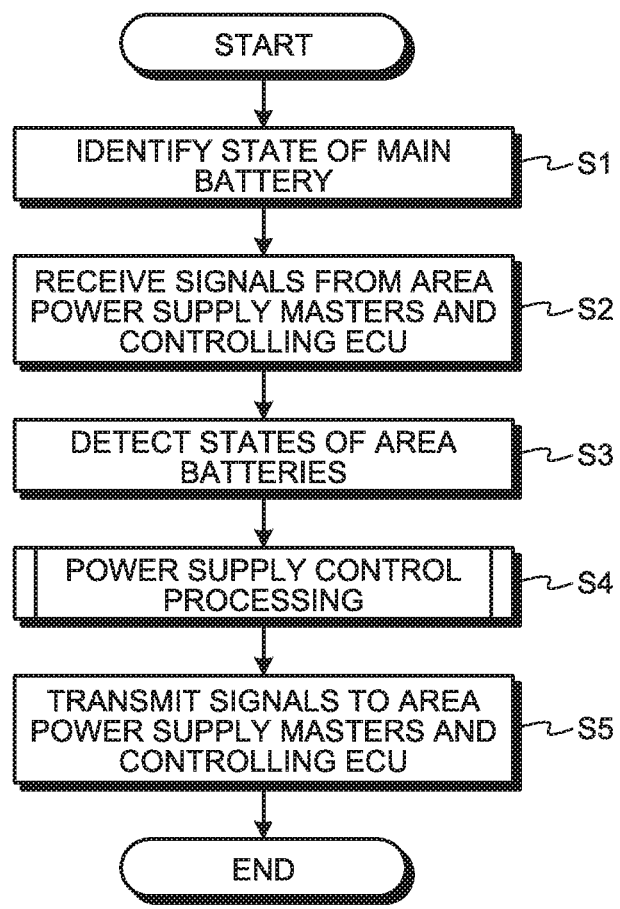
FIG. 4 is a flowchart illustrating the exemplary first operation of the vehicle power supply control device according to the first embodiment.

First exemplary operation of the vehicle power supply control device 1 according to the first embodiment is described next. In this example, description is given of exemplary operation of the vehicle power supply control device 1 in which it charges one of the area batteries 22 with power charged in the main battery 12 as illustrated in FIG. 3. The vehicle power supply master 10 identifies the state of the main battery 12 (Step S1) as illustrated in FIG. 4. For example, the vehicle power supply master 10 identifies a voltage value for the main battery 12. The vehicle power supply master 10 then receives signals regarding power, from the respective area power supply masters 20 and a controlling electronic control unit (ECU) (not illustrated) (Step S2). Here, the controlling ECU is configured to control the entirety of the vehicle and, for example, is configured to control a drive system such as an engine or a braking system such as brakes. The vehicle power supply master 10 then detects the states of the respective area batteries 22 from the corresponding area power supply masters 20 (Step S3). For example, the vehicle power supply master 10 detects the charging rate of the respective area batteries 22 from the corresponding area power supply masters 20. The vehicle power supply master 10 then performs power supply control processing (Step S4). For example, the vehicle power supply master 10 supplies power charged in the main battery 12 to the area power supply masters 20 based on the power generation capability of the power generating device 3 to charge the area batteries 22. The power supply control processing is described later in detail. The vehicle power supply master 10 then transmits signals to the area power supply masters 20 and the controlling ECU (Step S5), and ends the processing. For example, at the above-mentioned step S4, the vehicle power supply master 10 transmits information regarding the charging to the area power supply masters 20 and the controlling ECU. In the power supply control processing, the vehicle power supply master 10 thus charges the area batteries 22 by supplying power charged in the main battery 12 to the area power supply masters 20, based on the power generation capability of the power generating device 3.

Figure 5:
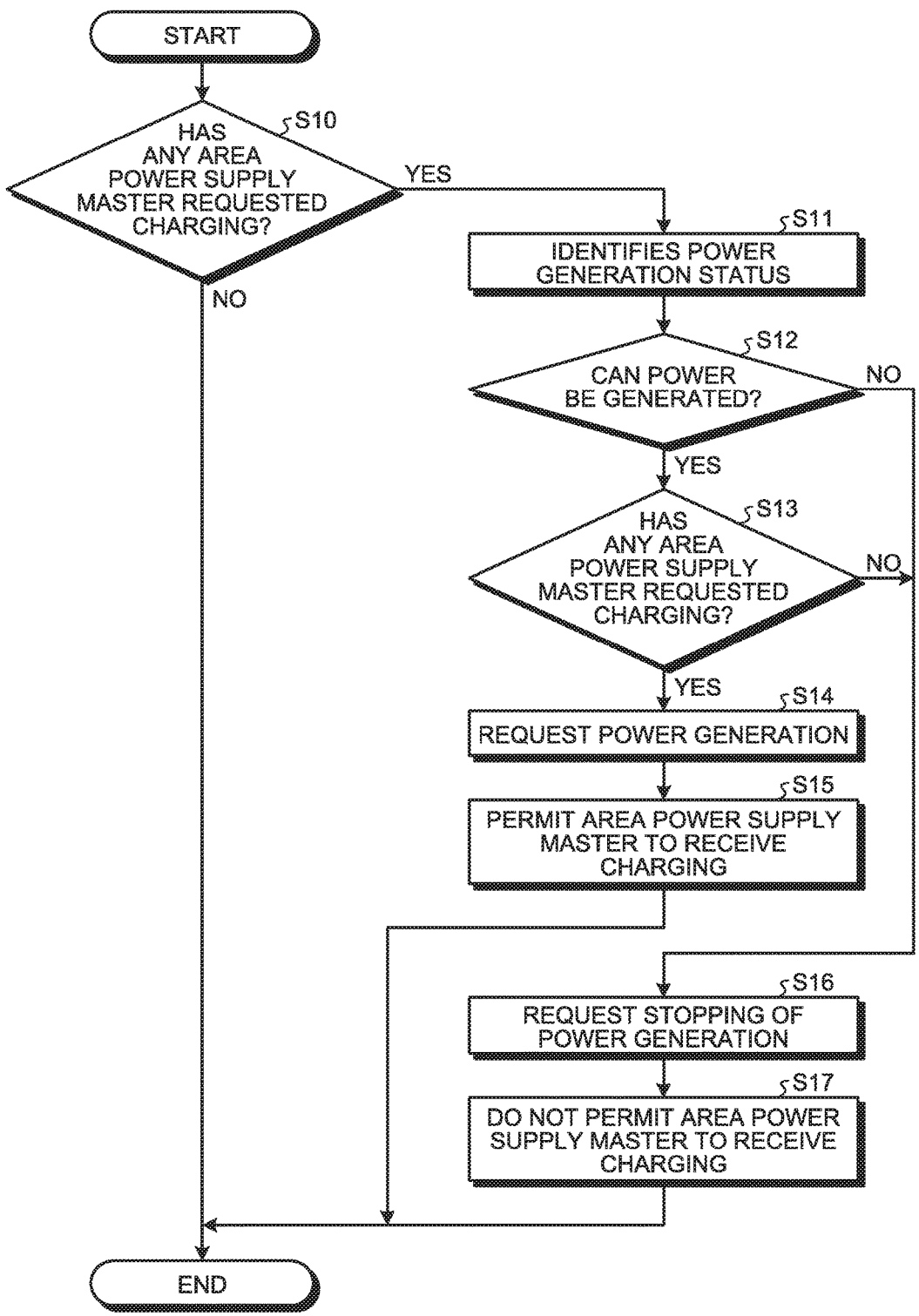
FIG. 5 is a flowchart illustrating the exemplary first operation of the vehicle power supply control device according to the first embodiment.

Next, the power supply control processing at the above-mentioned step S4 is described in detail. As illustrated in FIG. 5, the vehicle power supply master 10 determines whether any of the area power supply masters 20 has requested charging (Step S10). If any of the area power supply masters 20 has requested charging (Yes at Step S10), the vehicle power supply master 10 identifies the power generation status of the power generating device 3 (Step S11). The vehicle power supply master 10 then determines whether the power generating device 3 can generate power with which to charge the area batteries 22 (Step S12). If the power generating device 3 can generate power with which to charge the area batteries 22 (Yes at Step S12), the vehicle power supply master 10 determines whether any of the area power supply masters 20 has requested charging (Step S13). If any of the area power supply masters 20 has requested charging (Yes at Step S13), the vehicle power supply master 10 requests the power generating device 3 to generate power for charging the area power supply masters 20 (Step S14). As illustrated in FIG. 3, the vehicle power supply master 10 then permits the area power supply master 20 charging and supplies, to the area power supply master 20, power generated by the power generating device 3 and charged in the main battery 12 (Step S15). The vehicle power supply master 10 charges the area battery 22 of the area power supply master 20 and supplies power to the loads 2 via the area power supply master 20, thus ending the processing. When charging the area battery 22 of the area power supply master 20, the vehicle power supply master 10 may, without supplying power to the loads 2 via the area power supply master 20, perform nothing more than charging the area battery 22.

If the power generating device 3 cannot generate power with which to charge the area batteries 22 in the above-mentioned step S12 (No at Step S12), the vehicle power supply master 10 requests the power generating device 3 to stop generating power for charging the area power supply masters 20 (Step S16). The vehicle power supply master 10 then ends the processing without permitting the area power supply master 20 to be charged (Step S17). If, at the above-mentioned step S10, none of the area power supply masters 20 has requested charging (No at Step S10), the vehicle power supply master 10 ends the processing without supplying power generated by the power generating device 3 to the area power supply masters 20.

When one of the two area power supply masters 20 has requested charging, the vehicle power supply master 10 may charge the area battery 22 of that area power supply master 20 with power charged in the area battery 22 of the other area power supply master 20.

As described above, in the vehicle power supply control device 1 according to the first embodiment that performs the first exemplary operation, the vehicle power supply master 10 charges the area battery 22 of each of the area power supply masters 20 when that area power supply master 20 has requested the charging. For example, in the vehicle power supply control device 1, when one of the area power supply masters 20 has requested the charging, the vehicle power supply master 10 controls the charging so as to charge the area battery 22 of the one of the area power supply masters 20 with power supplied from the vehicle power supply master 10 and/or power charged in the area battery 22 of the other area power supply master 20. The vehicle power supply control device 1 is thus capable of supplying power to the loads 2 from the charged area batteries 22, thereby being capable of stably supplying power to the loads 2.

Figure 6:
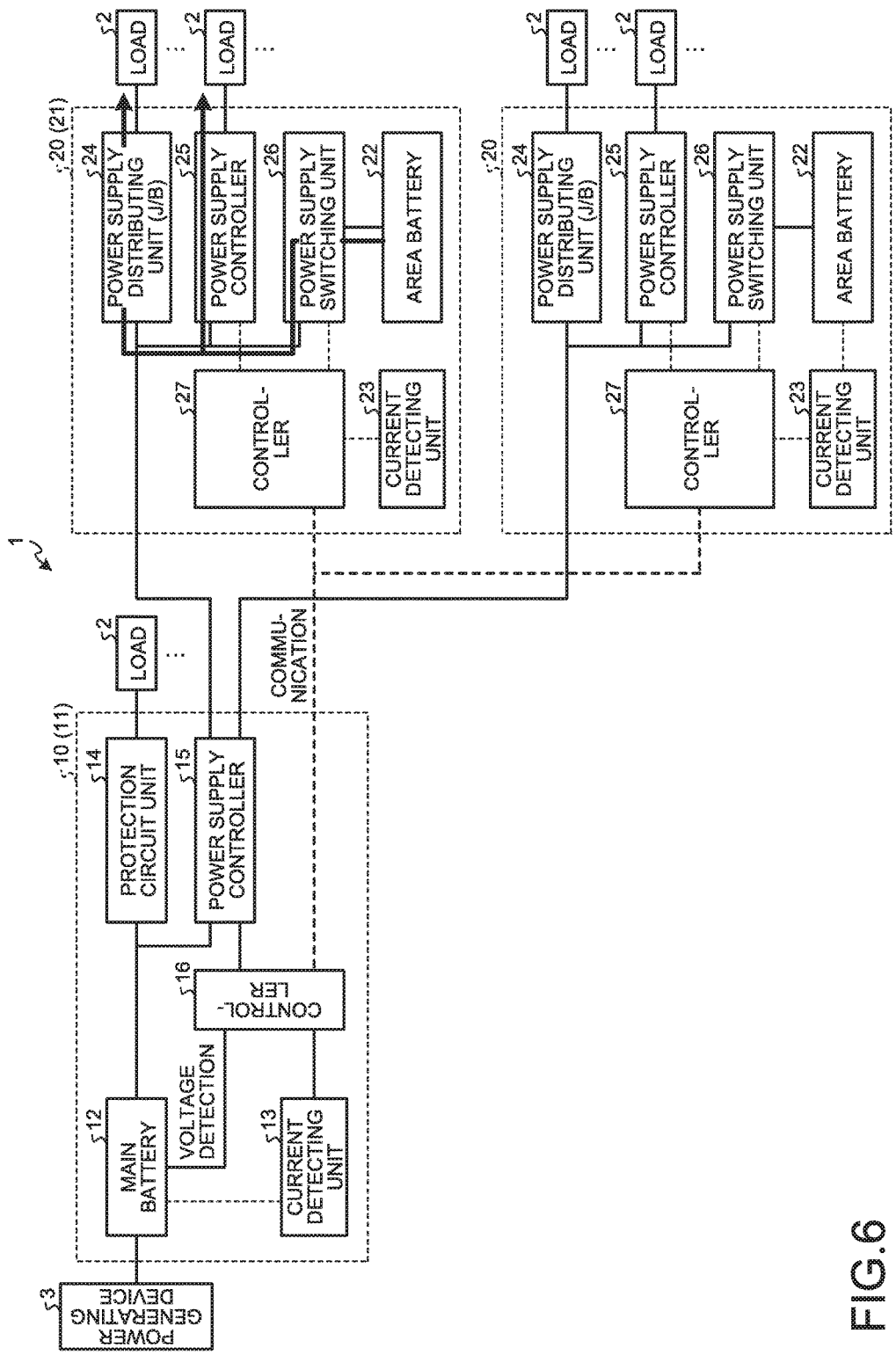
FIG. 6 is a diagram illustrating exemplary second operation of the vehicle power supply control device according to the first embodiment.
Figure 7:
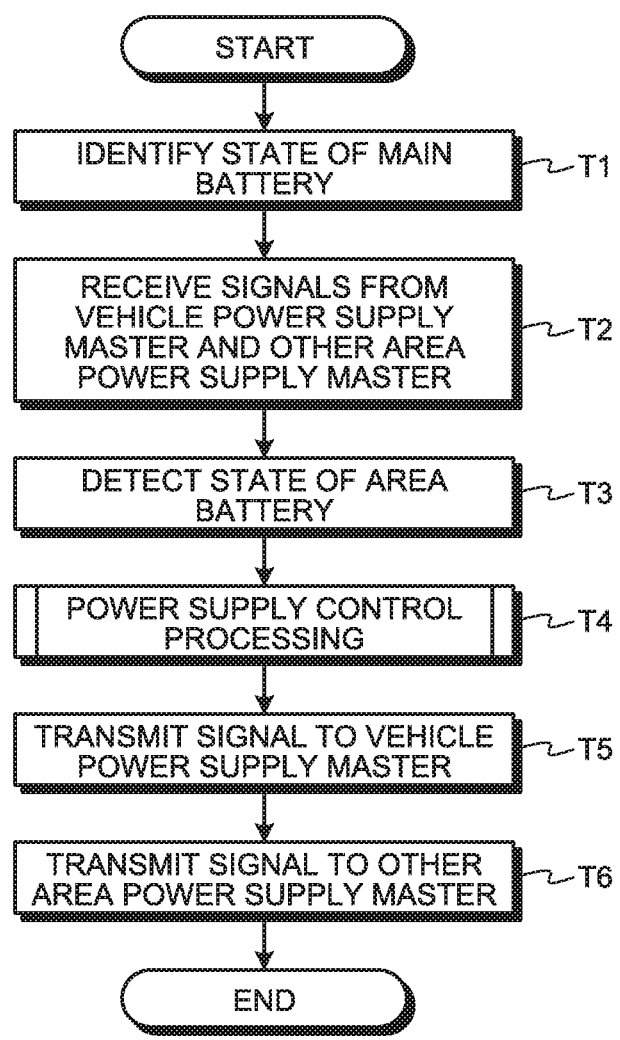
FIG. 7 is a flowchart illustrating the exemplary second operation of the vehicle power supply control device according to the first embodiment.

Second Exemplary Operation: Processing to be Performed when Power Cannot be Supplied from the Main Battery Second exemplary operation of the vehicle power supply control device 1 according to the first embodiment is described next. In this example, description is given of exemplary operation of the vehicle power supply control device 1 in a case when it is unable to supply power charged in the main battery 12 to the loads 2 via the area power supply masters 20 because of a reason such as degradation of the main battery 12, as illustrated in FIG. 6. Each of the area power supply masters 20 identifies the state (for example, voltage value) of the main battery 12 from the vehicle power supply master 10 (Step T1) as illustrated in FIG. 7. The area power supply master 20 then receives signals regarding power, from the vehicle power supply master 10 and the other area power supply master 20 (Step T2). The area power supply master 20 then detects the state (for example, state of charge) of the area battery 22 thereof (Step T3). The area power supply master 20 then performs power supply control processing (Step T4). For example, based on the states of the main battery 12 and the area battery 22, the area power supply master 20 supplies, to the loads 2, power charged in the main battery 12 and supplied from the vehicle power supply master 10 or power charged in the area battery 22. The power supply control processing is described later in detail. The area power supply master 20 then transmits a signal to the vehicle power supply master 10 (Step T5). For example, the area power supply master 20 transmits, to the vehicle power supply master 10, information regarding the power supplied at the above-mentioned step T4. Specifically, the area power supply master 20 transmits, to the vehicle power supply master 10, information that power charged in the main battery 12 is to be supplied to the loads 2 or information that power charged in the area battery 22 is to be supplied to the loads 2. The area power supply master 20 then transmits a signal to the other area power supply master 20 (Step T6) and ends the processing. For example, each of the area power supply masters 20 transmits, to the other area power supply master 20, information regarding the power supplied at the above-mentioned step T4. In the power supply control processing, the area power supply master 20 thus supplies power to the loads 2 based on the states of the main battery 12 and the area battery 22, the power being power charged in the main battery 12 that is supplied from the vehicle power supply master 10 or power charged in the area battery 22.

Figure 8:
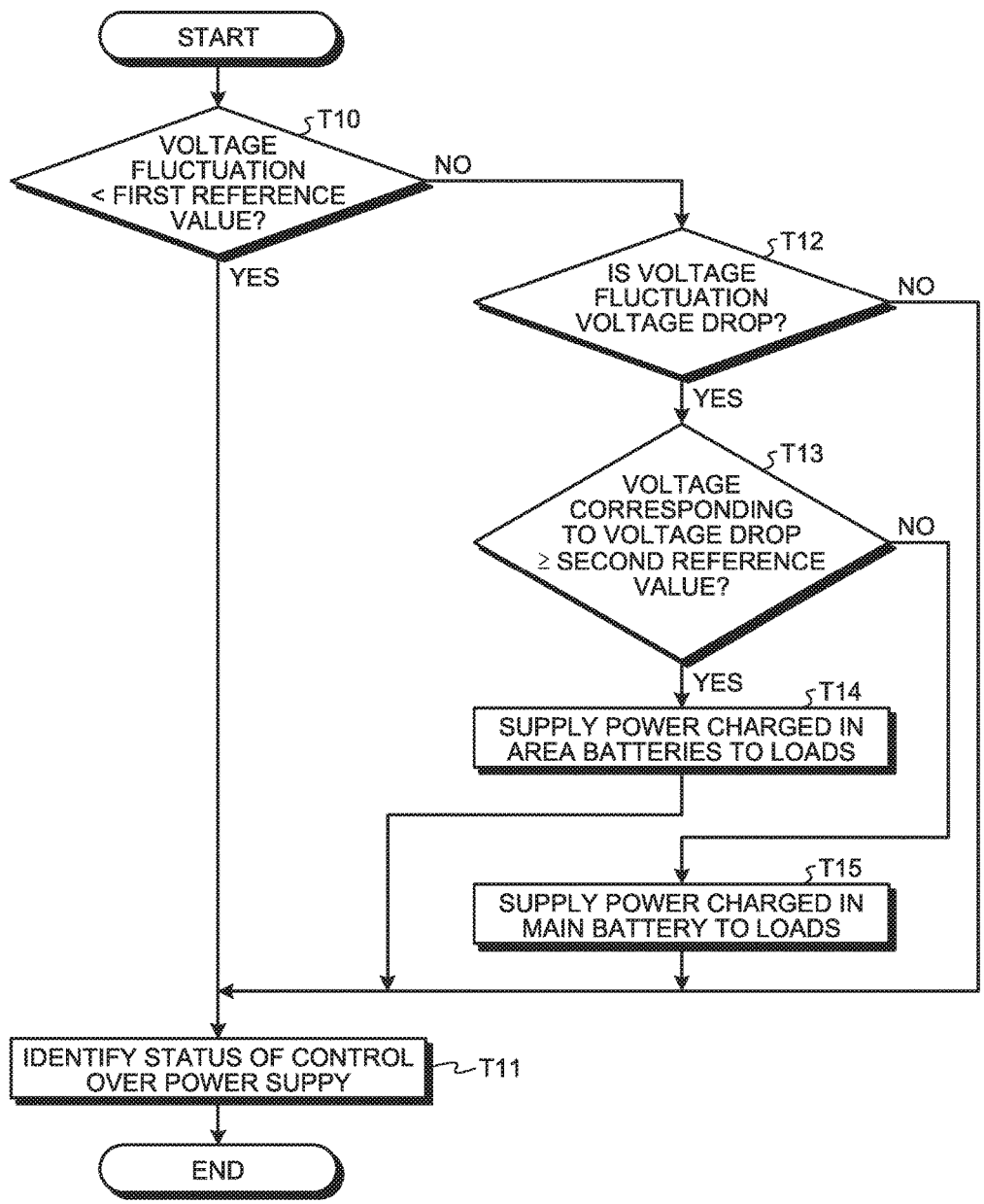
FIG. 8 is a flowchart illustrating the exemplary second operation of the vehicle power supply control device according to the first embodiment.

Next, the power supply control processing at the above-mentioned step T4 is described in detail. As illustrated in FIG. 8, each of the area power supply masters 20 determines whether fluctuation of the voltage value (voltage fluctuation) of the main battery 12 that has been identified at the above-mentioned step T1 is smaller than a first reference value previously determined (Step T10). If the voltage fluctuation of the main battery 12 is smaller than the first reference value (Yes at Step T10), the area power supply master 20 determines the main battery 12 to be operating properly, identifies the status of control over power supply such as power charged in the main battery 12 (Step T11), and then ends the processing.

If the voltage fluctuation of the main battery 12 is larger than or equal to the first reference value at the above-mentioned step T10 (No at Step T10), the area power supply master 20 determines whether the voltage fluctuation is a voltage drop (Step T12). If the voltage fluctuation of the main battery 12 is a voltage drop (Yes at Step T12), the area power supply master 20 determines whether voltage change in the voltage drop is equal to or larger than a second reference value previously determined (Step T13). If the voltage change in the voltage drop of the main battery 12 is equal to or larger than the second reference value (Yes at Step T13), the area power supply master 20 determines the main battery 12 to have degraded. The area power supply master 20 then stops power charged in the main battery 12 from being supplied thereto from the vehicle power supply master 10, supplies power charged in the area battery 22 to the loads 2 (Step T14), identifies the status of control over power supply of power such as charged in the area battery 22 (Step T11) as illustrated in FIG. 6, and ends the processing.

If the voltage fluctuation of the main battery 12 is smaller than the second reference value at the above-mentioned step T13 (No at Step T13), the area power supply master 20 determines the main battery 12 to be operating properly and supplies, to the loads 2, power charged in the main battery 12 supplied from the vehicle power supply master 10 (Step T15) without supplying power charged in the area battery 22 to the loads 2. The area power supply master 20 then identifies the status of control over power supply (Step T11) and ends the processing. If the voltage fluctuation of the main battery 12 is not a voltage drop but is a voltage increase at the above-mentioned step T12 (No at Step T12), the area power supply master 20 supplies to the loads 2, without supplying thereto power charged in the area battery 22 thereof, power charged in the main battery 12 that is supplied from the vehicle power supply master 10, identifies the status of control over power supply (Step T11), and ends the processing. In the vehicle power supply control device 1, when being able to supply power charged in the main battery 12 that is supplied from the vehicle power supply master 10 and power charged in the area battery 22 of the area power supply master 20 to the loads 2, each of the area power supply masters 20 may supply both power charged in the main battery 12 and power charged in the area battery 22 to the loads 2.

As described above, in the vehicle power supply control device 1 according to the first embodiment that performs the second exemplary operation, each of the area power supply masters 20 supplies at least either of power supplied from the vehicle power supply master 10 and power charged in the area battery 22 of the area power supply master 20 to the loads 2. The vehicle power supply control device 1 thus allows each of the area power supply masters 20 to use the corresponding area battery 22 as a backup battery. The vehicle power supply control device 1 is therefore capable of stably supplying power to the loads 2 via the area power supply masters 20.

Each of the area power supply masters 20 of the vehicle power supply control device 1 supplies power charged in the area battery 22 to the loads 2 when the vehicle power supply master 10 cannot supply power to the area power supply master 20. The vehicle power supply control device 1 thus can supply power charged in the area batteries 22, instead of power charged in the main battery 12, to the loads 2 when power is unable to be supplied to the loads 2 via the area power supply masters 20 from the vehicle power supply master 10 because of a reason such as degradation of the main battery 12.

Figure 9:
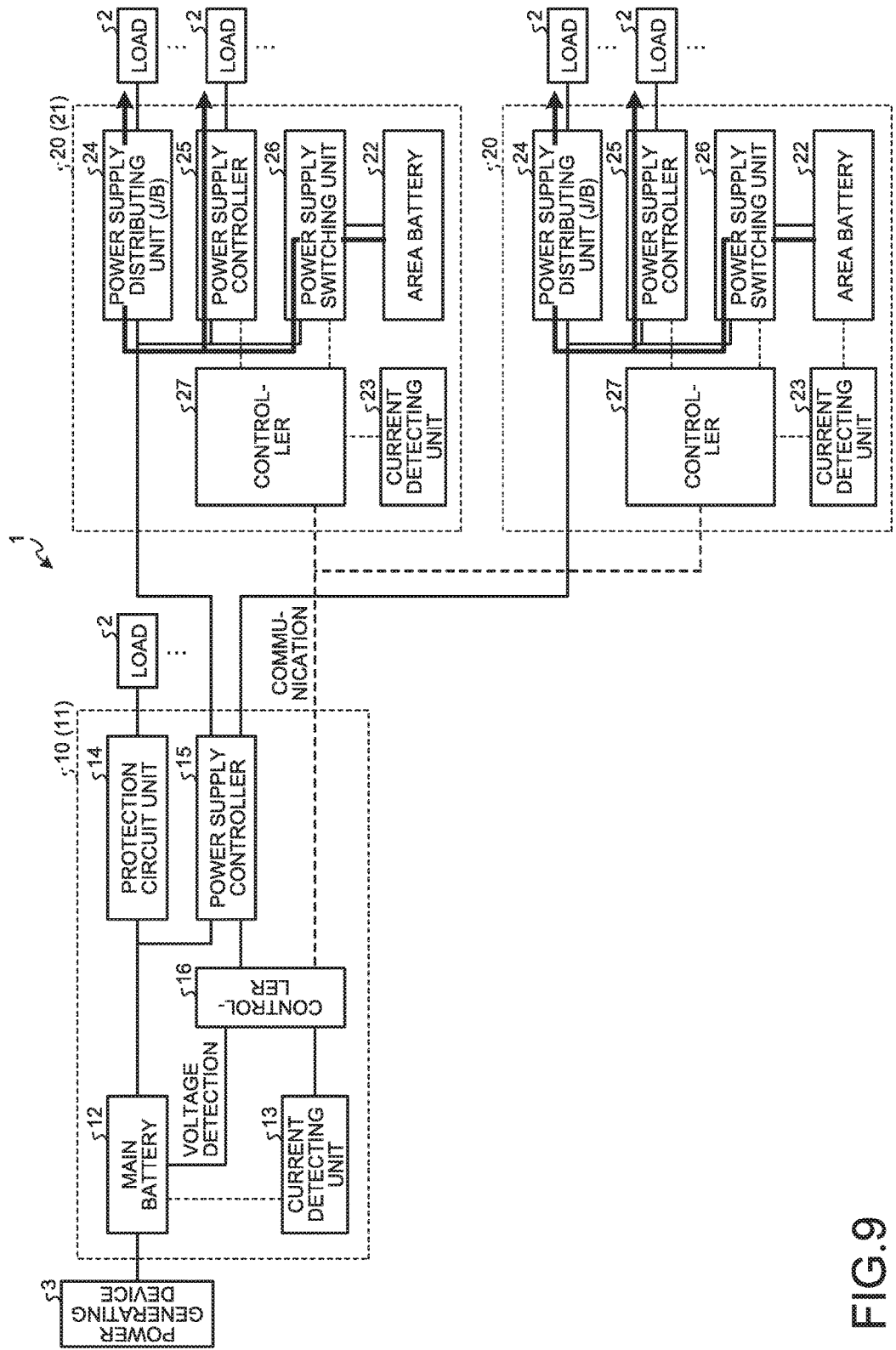
FIG. 9 is a diagram illustrating exemplary third operation of the vehicle power supply control device according to the first embodiment.
Figure 10:
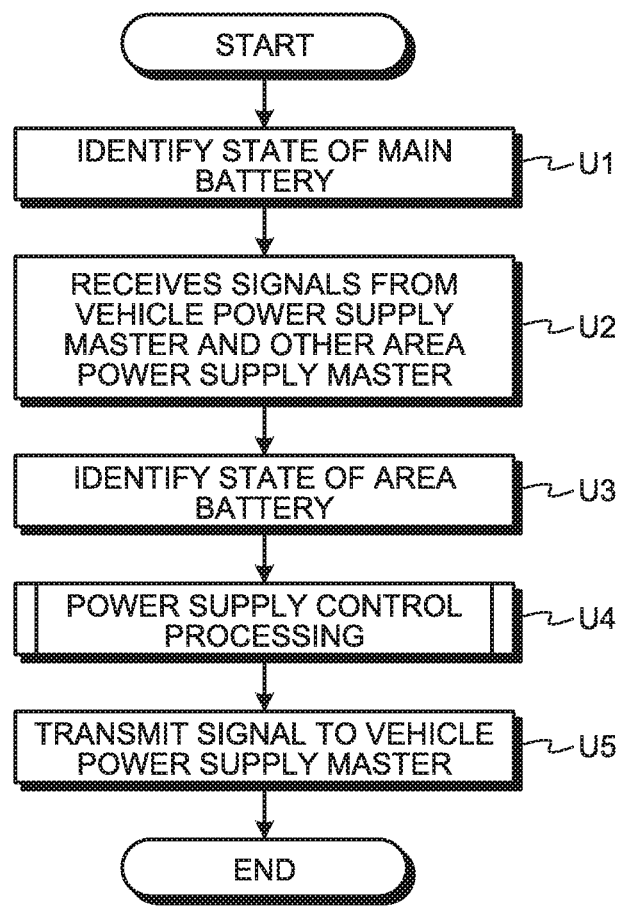
FIG. 10 is a flowchart illustrating the exemplary third operation of the vehicle power supply control device according to the first embodiment.

Third Exemplary Operation: Power Supply Processing Using Area Battery Having High State of Charge Third exemplary operation of the vehicle power supply control device 1 according to the first embodiment is described next. In this example, description is given of exemplary operation of the vehicle power supply control device 1 in which it supplies power charged in the area batteries 22, instead of power charged in the main battery 12, to the loads 2 when the states of charge of the respective area batteries 22 are relatively high, as illustrated in FIG. 9. Each of the area power supply masters 20 identifies the state (for example, voltage value) of the main battery 12 from the vehicle power supply master 10 (Step U1) as illustrated in FIG. 10. The area power supply master 20 then receives signals regarding power, from the vehicle power supply master 10 and the other area power supply master 20 (Step U2). The area power supply master 20 then detects the state (for example, state of charge) of the area battery 22 thereof (Step U3). The area power supply master 20 then performs power supply control processing (Step U4). For example, based on the state of charge of the area battery 22, the area power supply master 20 supplies power charged in the area battery 22, instead of power charged in the main battery 12, to the loads 2. The power supply control processing is described later in detail. The area power supply master 20 then transmits a signal to the vehicle power supply master 10 (Step U5) and ends the processing. For example, the area power supply master 20 transmits, to the vehicle power supply master 10, information regarding the power supplied at the above-mentioned step U4. For example, the area power supply master 20 transmits, to the vehicle power supply master 10, information that power charged in the area battery 22, instead of power charged in the main battery 12, is to be supplied to the loads 2. In the power supply control processing performed in this manner, the area power supply master 20 thus supplies power charged in the area battery 22, instead of power charged in the main battery 12, to the loads 2 based on the state of charge of the area battery 22.

Figure 11:
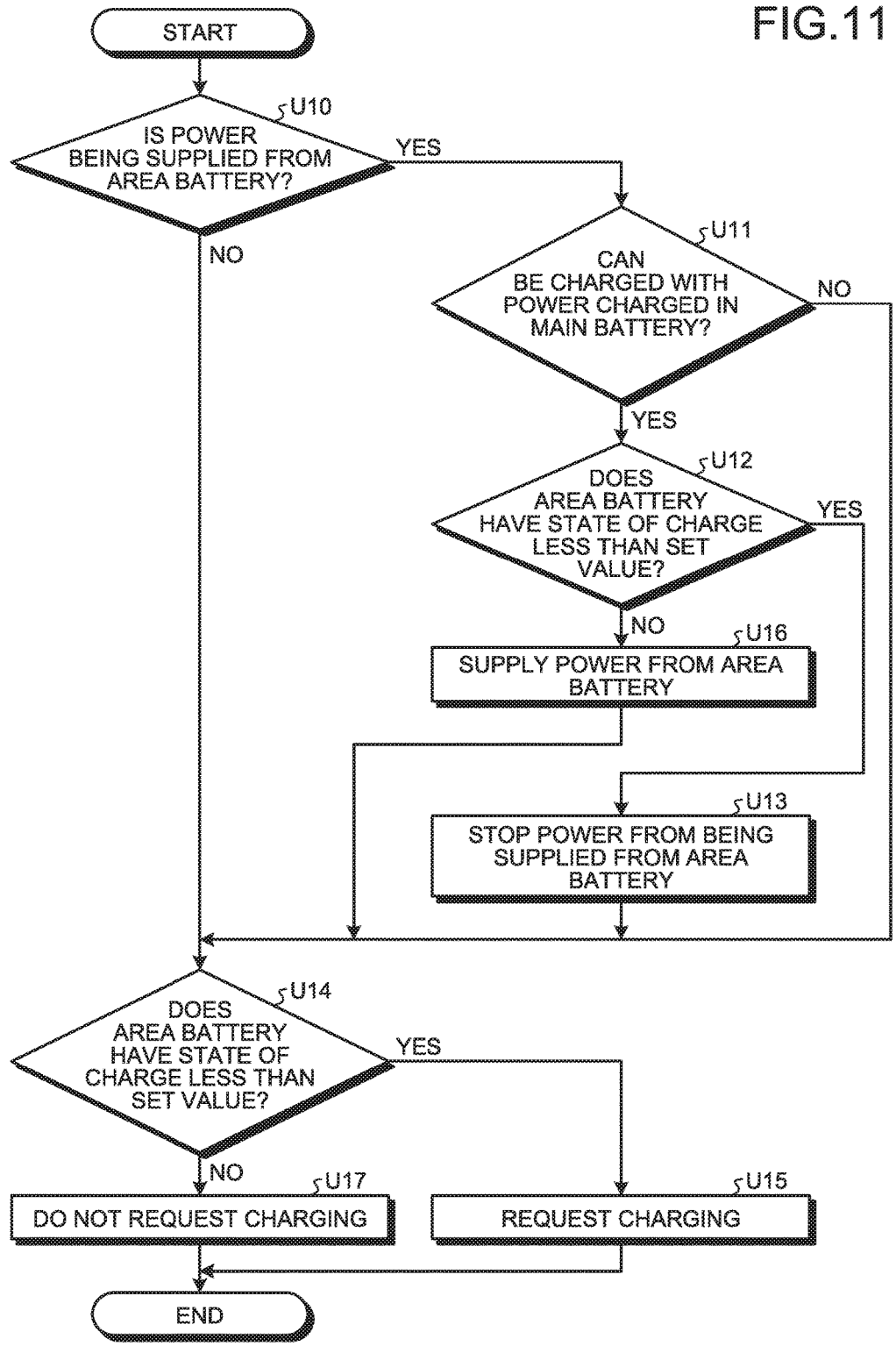
FIG. 11 is a flowchart illustrating the exemplary third operation of the vehicle power supply control device according to the first embodiment.

Next, the power supply control processing at the above-mentioned step U4 is described in detail. As illustrated in FIG. 11, each of the area power supply masters 20 determines whether power is being supplied from the area battery 22 thereof (Step U10). If power is being supplied to the loads 2 from the area battery 22 while the area battery 22 has a relatively high state of charge (Yes at Step U10), the area power supply master 20 determines whether the area battery 22 can be charged with power charged in the main battery 12 (Step U11). If the area battery 22 can be charged with power charged in the main battery 12 (Yes at Step U11), the area power supply master 20 determines whether the area battery 22 has a state of charge less than a set value previously determined (Step U12). Here, the set value is a threshold for determining whether to supply power to the loads 2 from the area battery 22, and is defined as a percentile. If the area battery 22 has a state of charge less than the set value (Yes at Step U12), the area power supply master 20 stops power from being supplied from the area battery 22 (Step U13), requests the vehicle power supply master 10 to charge the area battery 22 (Yes at Step U14; Step U15), and, as illustrated in FIG. 3, supply power charged in the main battery 12 instead of power charged in the area battery 22 to the loads 2, thereby ending the processing.

If the area battery 22 has a state of charge not less than the set value at the above-mentioned step U12 (No at Step U12), the area power supply master 20 supplies power from the area battery 22 to the loads 2 (Step U16) as illustrated in FIG. 9, and ends the processing without requesting the vehicle power supply master 10 to charge the area battery 22 (No at Step U14; Step U17). If, at the above-mentioned step U11, the area battery 22 cannot be charged with power charged in the main battery 12 (No at Step U11), the area power supply master 20 does not charge the area battery 22. If the area battery 22 is not supplying power but the main battery 12 is supplying power at the above-mentioned step U10 (No at Step U10), the area power supply master 20 determines whether the area battery 22 has a state of charge less than the set value (Step U14). If the area battery 22 has a state of charge less than the set value (Yes at Step U14), the area power supply master 20 requests charging (Step U15).

As described above, in the vehicle power supply control device 1 according to the first embodiment that performs the third exemplary operation, when the area battery 22 has a state of charge not less than the set value previously determined, the area power supply master 20 supplies power charged in the area battery 22 to the loads 2, and when the area battery 22 has a state of charge less than the set value, the area power supply master 20 does not supply power charged in the area battery 22 to the loads 2. The vehicle power supply control device 1 thus can reduce power consumption of the main battery 12 and therefore can reduce the load on the main battery 12. As a result, the vehicle power supply control device 1 can reduce the amount of power to be generated by the power generating device 3 that supplies power to the main battery 12, and therefore can reduce a load on the power generating device 3. Additionally, the capacity of an electric cable connected to the main battery 12 in the vehicle power supply control device 1 can be reduced, so that the electric cable can be made relatively thin in diameter.

In the vehicle power supply control device 1, each of the area power supply masters 20 preferentially supplies power charged in the area battery 22 thereof to the loads 2 on conditions that the vehicle power supply master 10 can supply power to the area power supply masters 20 and that the area battery 22 has a state of charge greater than or equal to a set value. The vehicle power supply control device 1 thus can further reduce power consumption of the main battery 12.

Fourth Exemplary Operation: Power Supply Processing Using Other Area Battery

Figure 12:
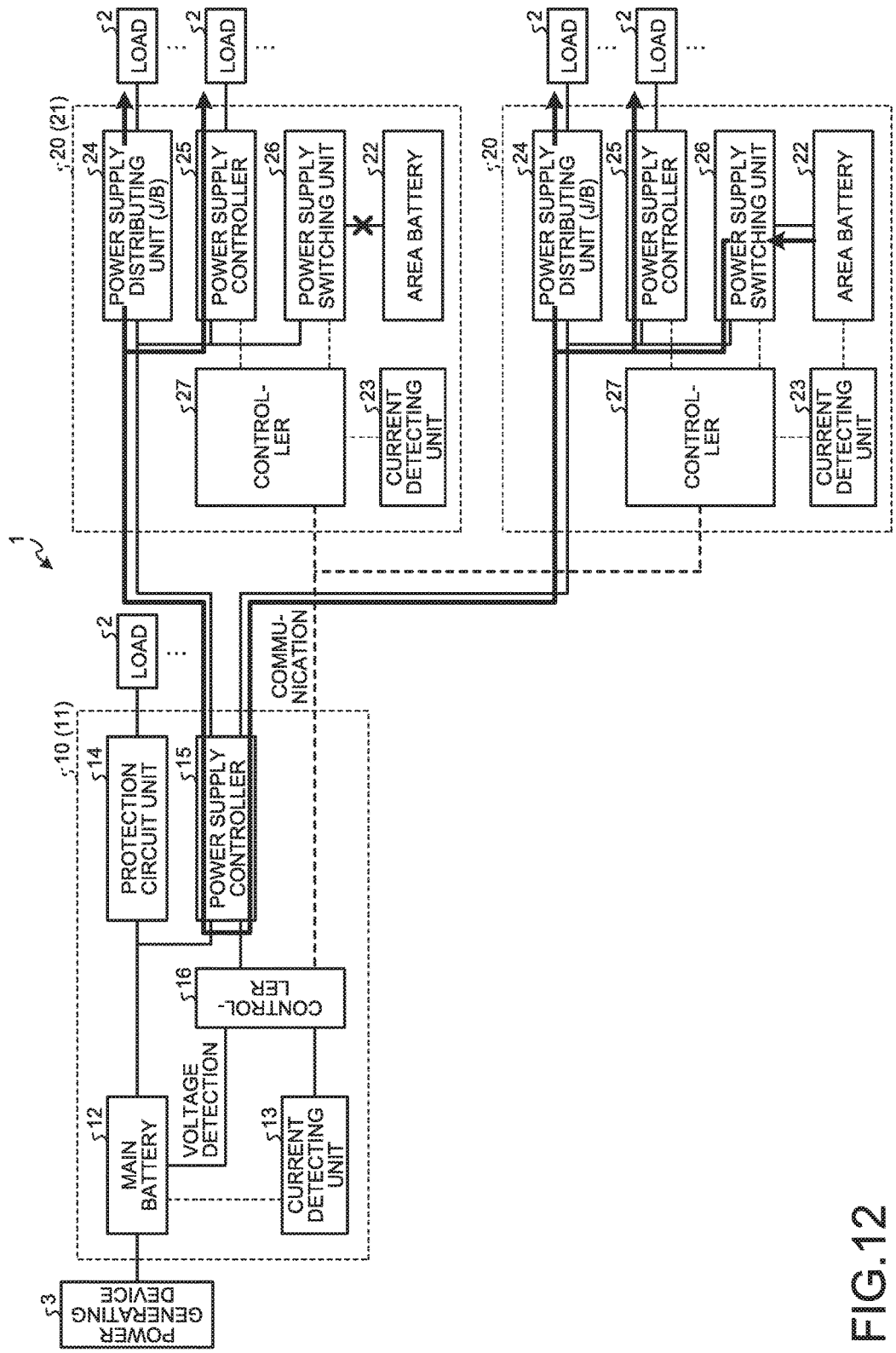
FIG. 12 is a diagram illustrating exemplary fourth operation of the vehicle power supply control device according to the first embodiment.
Figure 13:
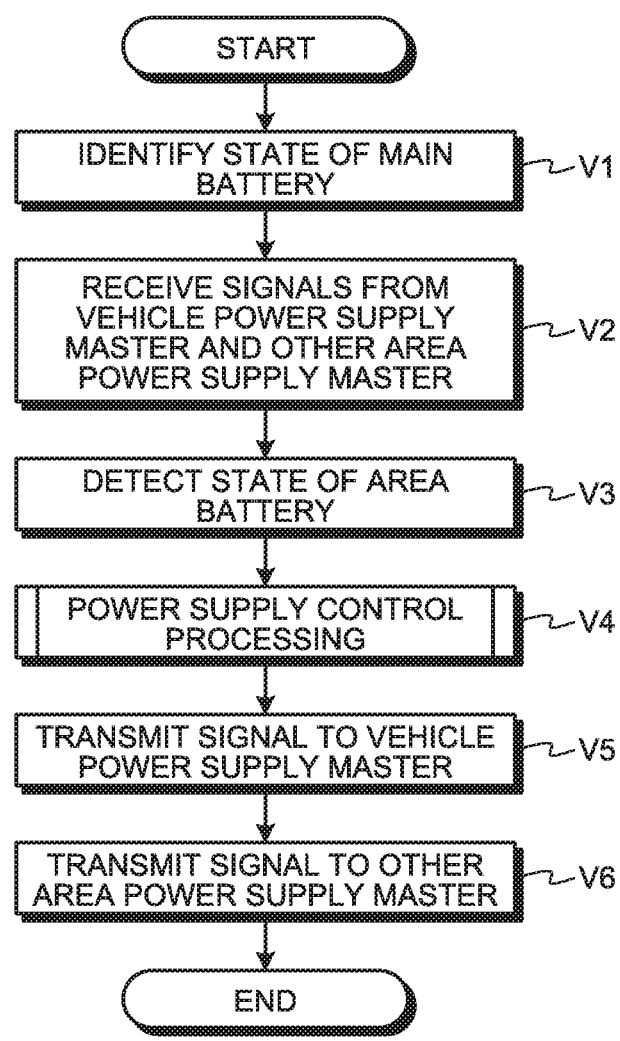
FIG. 13 is a flowchart illustrating the exemplary fourth operation of the vehicle power supply control device according to the first embodiment.

Fourth exemplary operation of the vehicle power supply control device 1 according to the first embodiment is described next. In this example, description is given of exemplary operation in which the vehicle power supply control device 1 supplies power charged in the area battery 22 of one of the area power supply masters 20 to the loads 2 connected to the other area power supply master 20 as illustrated in FIG. 12. Each of the area power supply masters 20 identifies the state (for example, voltage value) of the main battery 12 from the vehicle power supply master 10 (Step V1) as illustrated in FIG. 13. The area power supply master 20 then receives, from the vehicle power supply master 10 and the other area power supply master 20, signals regarding power (Step V2). The area power supply master 20 then detects the state (for example, state of charge) of the area battery 22 thereof (Step V3). The area power supply master 20 then performs power supply control processing (Step V4). For example, one of the area power supply masters 20 supplies power charged in the area battery 22 thereof to the loads 2 that are connected to the other area power supply master 20 when the other area power supply master 20 cannot supply power charged in the area battery 22 thereof to the loads 2. The power supply control processing is described later in detail. The area power supply master 20 then transmits a signal to the vehicle power supply master 10 (Step V5). For example, each of the area power supply masters 20 transmits, to the vehicle power supply master 10, information regarding the power supplied at the above-mentioned step V4. Specifically, the one of the area power supply masters 20 transmits, to the vehicle power supply master 10, information that the area power supply master 20 supplies power charged in the area battery 22 thereof to the loads 2 connected to the other area power supply master 20. Each of the area power supply masters 20 then transmits a signal to the other area power supply master 20 (Step V6), and ends the processing. In the power supply control processing, one of the area power supply masters 20 thus supplies power charged in the area battery 22 of that area power supply master 20 to the loads 2 connected to the other area power supply master 20.

Figure 14:
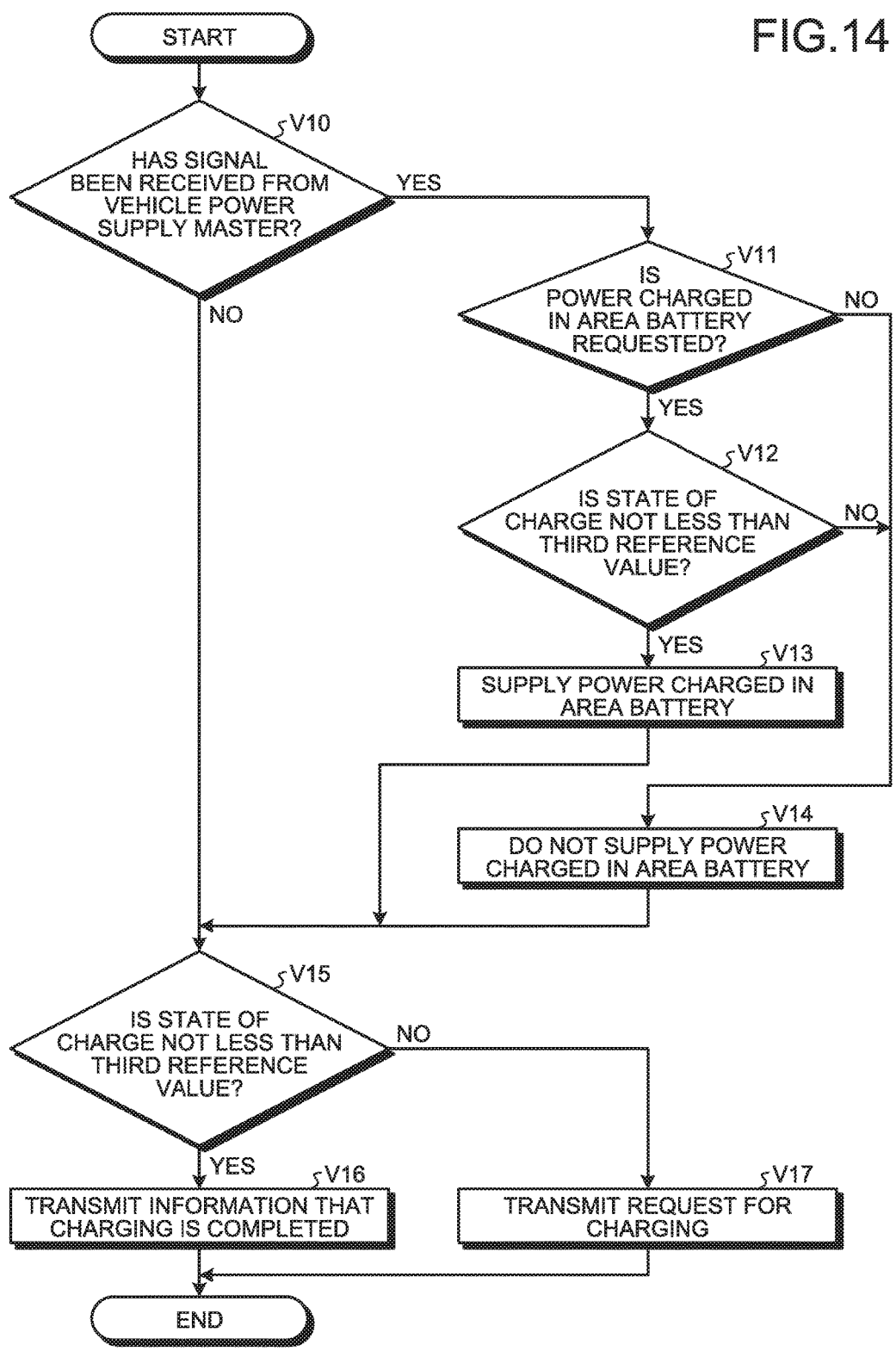
FIG. 14 is a flowchart illustrating the exemplary fourth operation of the vehicle power supply control device according to the first embodiment.

Next, the power supply control processing at the above-mentioned step V4 is described in detail. As illustrated in FIG. 14, each of the area power supply masters 20 determines whether it has received a signal from the vehicle power supply master 10 (Step V10). If the area power supply master 20 has received a signal from the vehicle power supply master 10 (Yes at Step V10), the area power supply master 20 determines whether the signal requests power charged in the area battery 22 of the area power supply master 20 to be supplied to the other area power supply master 20 (Step V11). If the signal requests that power charged in the area battery 22 of the area power supply master 20 to be supplied to the other area power supply master 20 (Yes at Step V11), the area power supply master 20 determines whether the area battery 22 thereof has a state of charge not less than a third reference value previously determined (Step V12). If that area battery 22 has a state of charge not less than the third reference value (Yes at Step V12), the area power supply master 20 supplies power charged in the area battery 22 thereof, via the vehicle power supply master 10, to the loads 2 connected to the other area power supply master 20 as illustrated in FIG. 12 (Step V13). If that area battery 22 has a state of charge less than the third reference value (No at Step V12), the area power supply master 20 does not supply power charged in the area battery 22 thereof to the loads 2 connected to the other area power supply master 20 (Step V14).

If the signal does not request at the above-mentioned step V11 that power charged in the area battery 22 of the area power supply master 20 be supplied to the other area power supply master 20 (No at Step V11), the area power supply master 20 does not supply power charged in the area battery 22 thereof to the loads 2 connected to the other area power supply master 20 (Step V14). If the area power supply masters 20 have received no signal from the vehicle power supply master 10 at the above-mentioned step V10 (No at Step V10), the area power supply masters 20 determine whether the area battery 22 thereof has a state of charge not less than the third reference value previously determined (Step V15). If that area battery 22 has a state of charge not less than the third reference value previously determined (Yes at Step V15), the area power supply master 20 transmits, to the vehicle power supply master 10, information that charging of that area battery 22 is completed (Step V16), and ends the processing. If that area battery 22 has a state of charge less than the third reference value (No at Step V15), the area power supply master 20 transmits a request for the charging to the vehicle power supply master 10 (Step V17) and ends the processing.

As described above, in the vehicle power supply control device 1 according to the first embodiment that performs the fourth exemplary operation, the vehicle power supply master 10 performs control so that, according to the situation, power charged in the area battery 22 of one of the area power supply masters 20 can be supplied to the loads 2 connected to the other area power supply master 20. In the vehicle power supply control device 1, the area power supply masters 20 are able to supply power to each other, thereby being able to stably supply power to the loads 2.

For example, the vehicle power supply master 10 in the vehicle power supply control device 1 performs control to cause one of the area power supply masters 20 to supply power charged in the area battery 22 thereof to the loads 2 connected to the other area power supply master 20 when power charged in the area battery 22 of the other area power supply master 20 cannot be supplied to the loads 2. The vehicle power supply control device 1 thus can supply power from the area battery 22 of the one of the area power supply masters 20, without supplying power from the main battery 12, to the loads 2 when power cannot be supplied to the loads 2 from the area battery 22 of the other area power supply master 20 because of a reason such as degradation of that area battery 22. As a result, the vehicle power supply control device 1 can reduce power consumption of the main battery 12 and therefore can reduce the load on the main battery 12. The vehicle power supply control device 1 thus can reduce power generation of the power generating device 3 that supplies power to the main battery 12, and therefore can reduce the load on the power generating device 3. Additionally, the capacity of an electric cable connected to the main battery 12 in the vehicle power supply control device 1 can be reduced, so that the electric cable can be made relatively thin in diameter. The vehicle power supply control device 1 may be configured to supply power charged in the area battery 22 of one of the area power supply masters 20 to the loads 2 connected to the other area power supply master 20 not via the vehicle power supply master 10.

Figure 15:
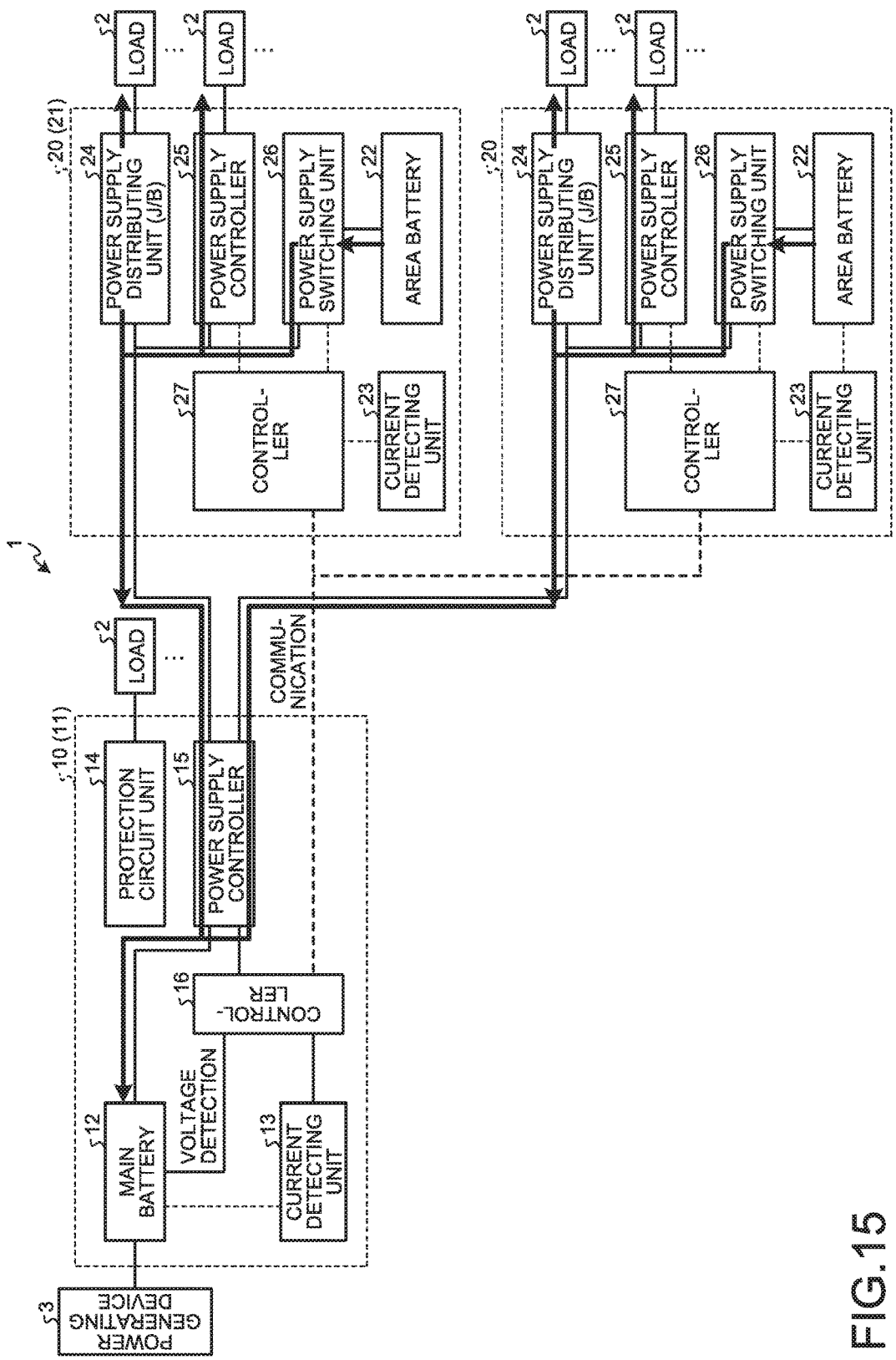
FIG. 15 is a diagram illustrating exemplary fifth operation of the vehicle power supply control device according to the first embodiment.
Figure 16:
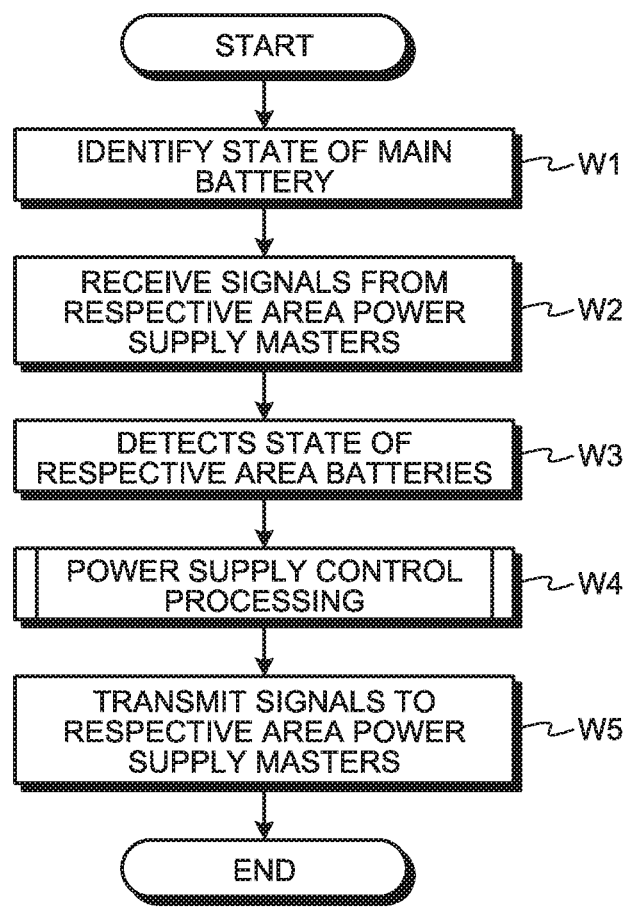
FIG. 16 is a flowchart illustrating the exemplary fifth operation of the vehicle power supply control device according to the first embodiment.

Fifth Exemplary Operation: Power Supply Processing from Area Battery to Main Battery Fifth exemplary operation of the vehicle power supply control device 1 according to the first embodiment is described next. In this example, description is given of exemplary operation of the vehicle power supply control device 1 in which it supplies power charged in the area batteries 22 to the vehicle power supply master 10 as illustrated in FIG. 15. The vehicle power supply master 10 identifies the state (for example, voltage value) of the main battery 12 (Step W1) as illustrated in FIG. 16. The vehicle power supply master 10 then receives signals regarding power, from the respective area power supply masters 20 (Step W2). The vehicle power supply master 10 then detects the states (for example, states of charge) of the respective area batteries 22 from the corresponding area power supply masters 20 (Step W3). The vehicle power supply master 10 then performs power supply control processing (Step W4). For example, in response to a decrease in state of charge of the main battery 12, the vehicle power supply master 10 supplies power charged in any of the area batteries 22 to the main battery 12. The power supply control processing is described later in detail. The vehicle power supply master 10 then transmits a signal to each of the area power supply masters 20 (Step W5), and ends the processing. For example, at the above-mentioned step W4, the vehicle power supply master 10 transmits, to each of the area power supply masters 20, information regarding the power supply of the area battery 22. In this manner, in response to a decrease in state of charge of the main battery 12, the vehicle power supply master 10 supplies power charged in the area battery 22 to the main battery 12.

Figure 17:
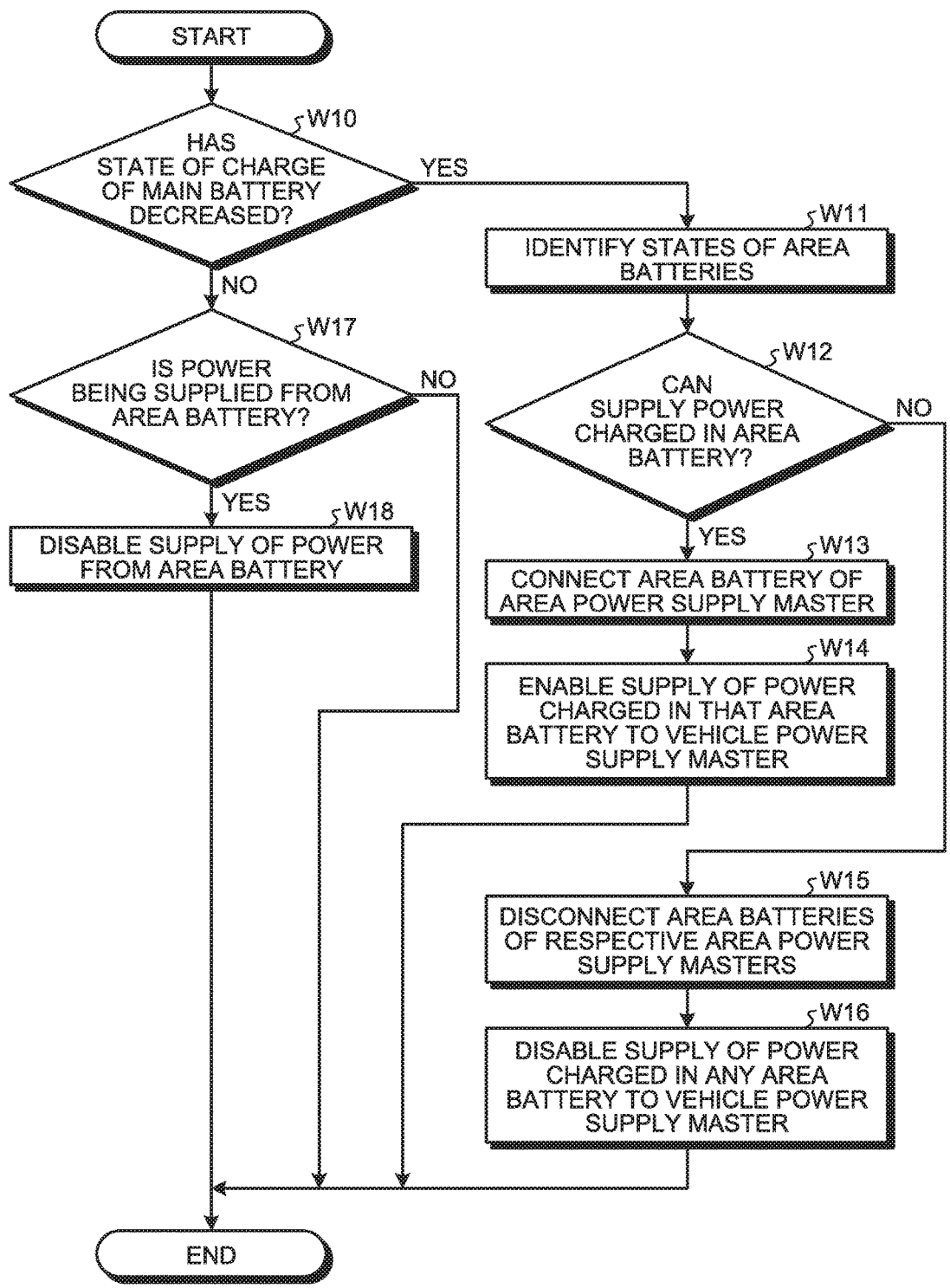
FIG. 17 is a flowchart illustrating the exemplary fifth operation of the vehicle power supply control device according to the first embodiment.

Next, the power supply control processing at the above-mentioned step W4 is described in detail. As illustrated in FIG. 17, the vehicle power supply master 10 determines whether the state of charge of the main battery 12 has decreased (Step W10). If the state of charge of the main battery 12 has decreased (Yes at Step W10), the vehicle power supply master 10 identifies the states (for example, states of charge) of the area batteries 22 of the area power supply masters 20 (Step W11). The vehicle power supply master 10 then determines whether each of the area power supply masters 20 can supply power charged in the area battery 22 thereof (Step W12). If any of the area power supply masters 20 can supply power charged in the area battery 22 thereof (Yes at Step W12), the vehicle power supply master 10 connects to the area battery 22 of the area power supply master 20 that can supply power (Step W13) as illustrated in FIG. 15, and enables supply of power charged in the area battery 22 of the connected area power supply master 20 to the vehicle power supply master 10 (Step W14). If none of the area power supply masters 20 can supply power charged in the area battery 22 thereof (No at Step W12), the vehicle power supply master 10 disconnects the area batteries 22 of the respective area power supply masters 20 therefrom (Step W15) and disables supply of power charged in any of the area batteries 22 of the area power supply masters 20 to the vehicle power supply master 10 (Step W16).

If the state of charge of the main battery 12 has not decreased in the above-mentioned step W10 (No at Step W10), the vehicle power supply master 10 determines whether any of the area power supply masters 20 is supplying power from the area battery 22 thereof to the main battery 12 (Step W17). If any of the area power supply masters 20 is supplying power from the area battery 22 thereof to the main battery 12 (Yes at Step W17), the vehicle power supply master 10 configures that area power supply master 20 so as not to supply power charged in the area battery 22 thereof to the main battery 12 (Step W18), and ends the processing. If none of the area power supply masters 20 is supplying power from the area battery 22 thereof to the main battery 12 (No at Step W17), the vehicle power supply master 10 ends the processing.

As described above, in the vehicle power supply control device 1 according to the first embodiment that performs the fifth exemplary operation, power charged in any of the area batteries 22 is supplied to the vehicle power supply master 10 when the state of charge of the main battery 12 has decreased. The vehicle power supply control device 1 thus can charge the main battery 12 by supplying thereto power charged in the area battery 22, and therefore can prevent decrease in state of charge of the main battery 12 without resorting to the use of the power generating device 3.

While an example is described above in which the vehicle power supply control device 1 includes two area power supply masters 20, this example is not limiting. The vehicle power supply control device 1 may use one area power supply master 20 or may use more than two area power supply masters 20.

Second Embodiment

Figure 18:
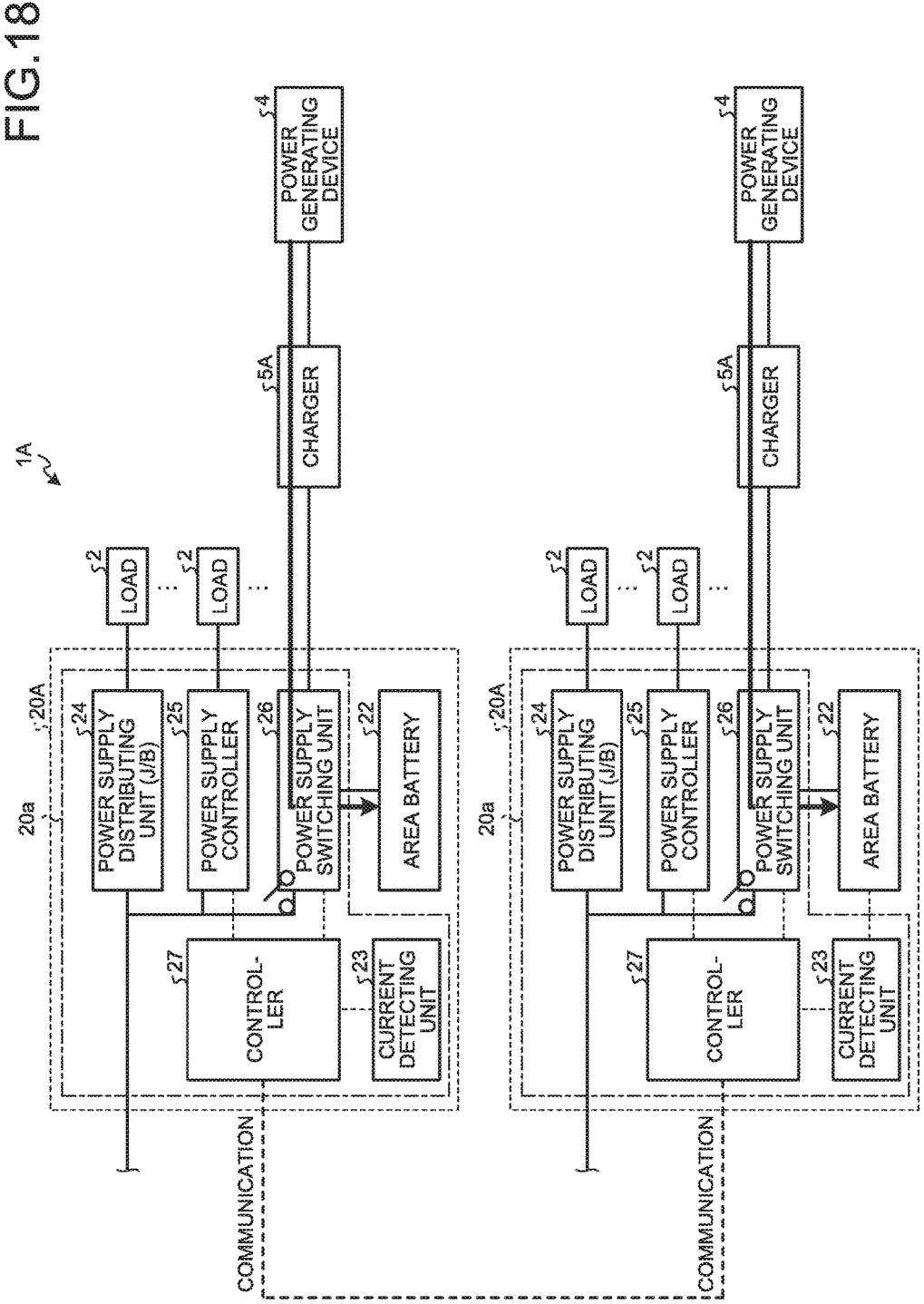
FIG. 18 is a block diagram illustrating an exemplary configuration of a vehicle power supply control device according to a second embodiment.

A vehicle power supply control device 1A according to a second embodiment is described next. The vehicle power supply control device 1A according to the second embodiment is different from the device according to the first embodiment in that the area batteries 22 of a plurality of area power supply masters 20A are charged by power generating devices 4, as illustrated in FIG. 18. Each of the different power generating devices 4 is connected to the corresponding area power supply master 20A without the vehicle power supply master 10 therebetween. Different chargers (converters) 5A are each provided between the corresponding area power supply master 20A and the corresponding power generating device 4. The respective chargers 5A convert the voltage of power generated by the corresponding power generating devices 4. Each of the area power supply masters 20A causes the power supply switching unit 26 thereof to perform the switching to supply the power the voltage of which has been converted by the corresponding charger 5A to the corresponding area battery 22.

As described above, in the vehicle power supply control device 1A according to the second embodiment, each of the power generating devices 4 that generate power is connected to the corresponding area power supply master 20A without the vehicle power supply master 10 therebetween, and the corresponding area battery 22 is charged with power generated by the corresponding power generating device 4. The vehicle power supply control device 1A thus can use each of the area power supply master 20A as a backup power supply when power cannot be supplied from the vehicle power supply master 10 because of a reason such as degradation of the main battery 12. The vehicle power supply control device 1A is therefore capable of stably supplying power to each load 2. Furthermore, the vehicle power supply control device 1A can reduce power consumption of the main battery 12.

Modification of Second Embodiment

Figure 19:
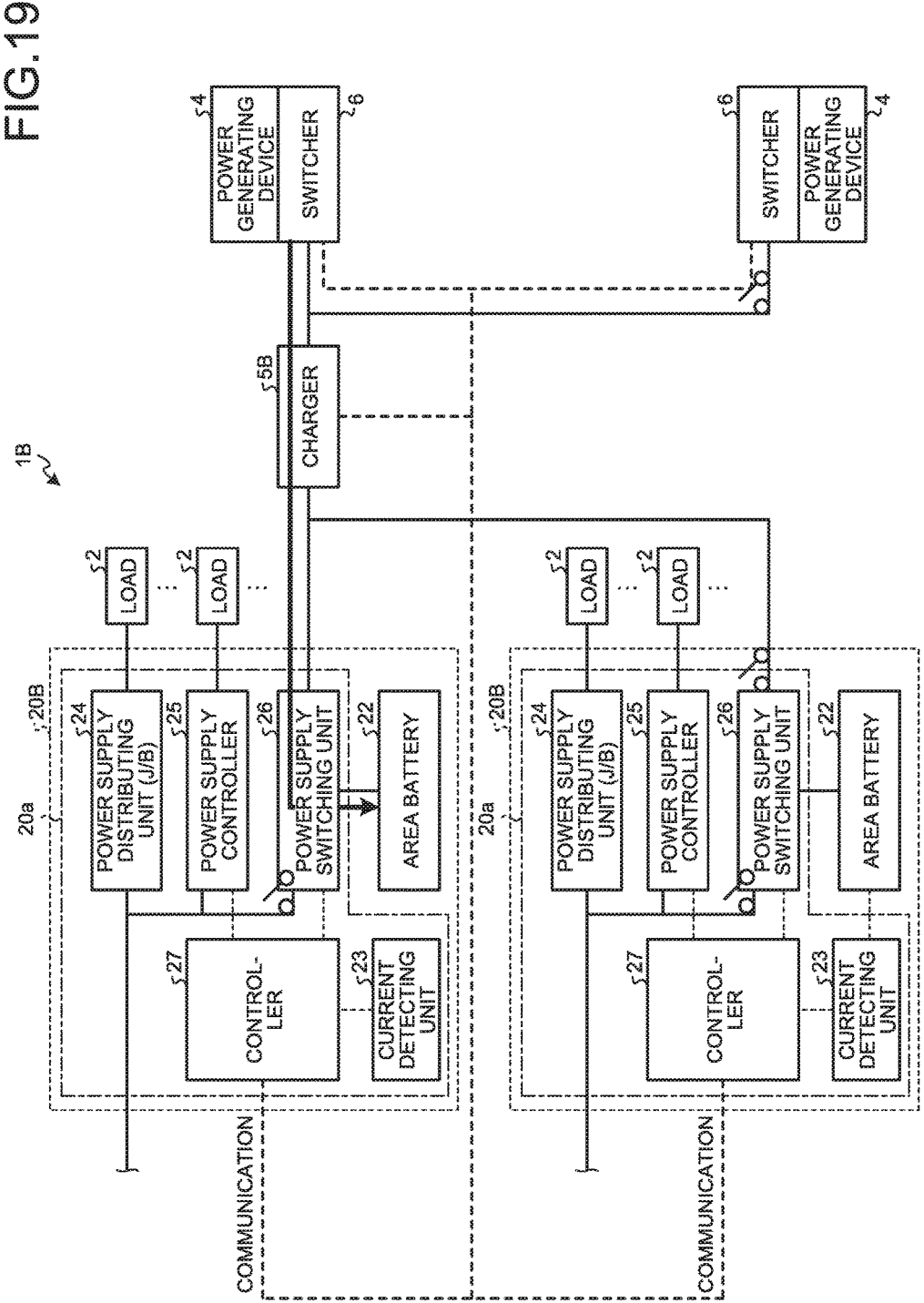
FIG. 19 is a block diagram illustrating an exemplary configuration of a vehicle power supply control device according to a modification of the second embodiment.

A vehicle power supply control device 1B according to a modification of the second embodiment is described next. The vehicle power supply control device 1B includes one charger 5B between the area power supply masters 20B and the power generating devices 4, as illustrated in FIG. 19. The charger 5B individually converts the voltage of power generated by the power generating devices 4, and supplies power to the individual area power supply masters 20B after the voltage of the power is converted. Each of the area power supply masters 20B causes the power supply switching unit 26 thereof to perform the switching to supply the power the voltage of which has been converted by the charger 5B to the corresponding area battery 22.

Figure 20:
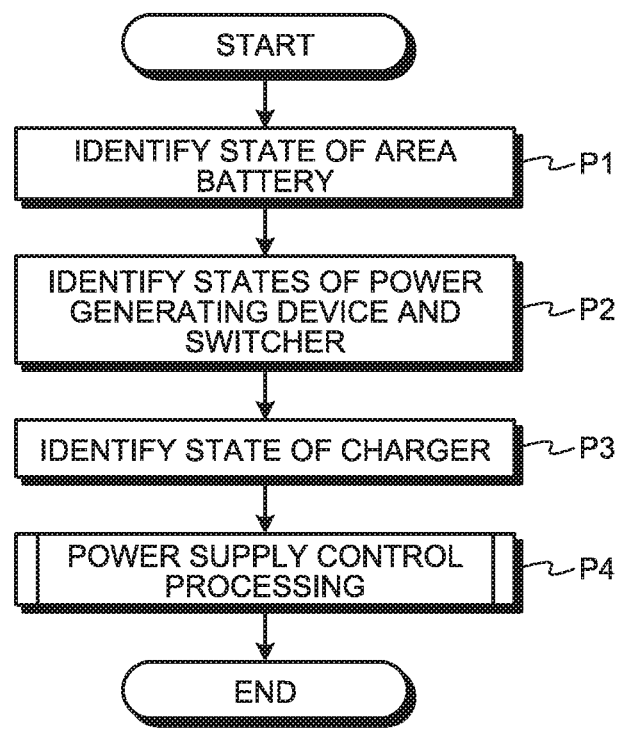
FIG. 20 is a flowchart illustrating exemplary operation of the vehicle power supply control device according to the modification of the second embodiment.

Sixth Exemplary Operation: Charge Processing on Area Battery by Power Generating Device Sixth exemplary operation of the vehicle power supply control device 1B according to the first embodiment is described next. Each of the area power supply masters 20B identifies the state (for example, state of charge) of the area battery 22 thereof as illustrated in FIG. 20 (Step P1). The area power supply master 20B then identifies the states of each power generating device 4 and each switcher 6 (Step P2). The area power supply master 20B then identifies the state of the charger 5B (Step P3). The area power supply master 20B then performs power supply control processing (Step P4), and ends the processing. For example, each of the area power supply masters 20B supplies power generated by each power generating device 4 to the area battery 22 thereof, based on the state of charge of that area battery 22. The power supply control processing is described later in detail.

Figure 21:
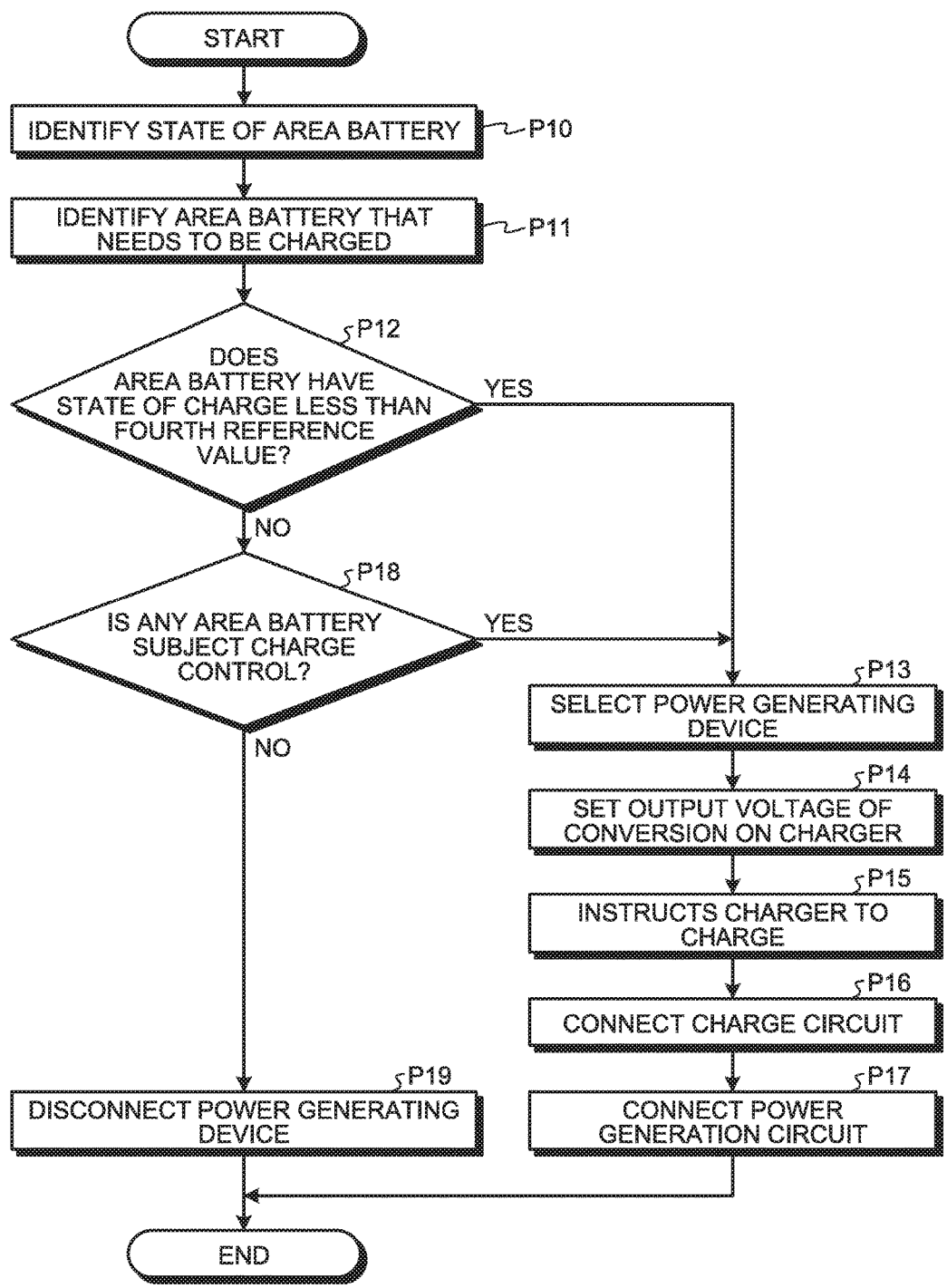
FIG. 21 is a flowchart illustrating the exemplary operation of the vehicle power supply control device according to the modification of the second embodiment.

Next, the power supply control processing at the above-mentioned step P4 is described in detail. Each of the area power supply masters 20B identifies the state (state of charge) of the area battery 22 thereof (Step P10) as illustrated in FIG. 21. The area power supply master 20B then identifies the area batteries 22 that needs to be charged (Step P11). For example, the area power supply master 20B specifies, as the area battery 22 that needs to be charged, the area battery 22 that is not supplying power. Each of the area power supply masters 20B then determines whether the area battery 22 that is not supplying power has a state of charge less than a fourth reference value previously determined (Step P12). If the area battery 22 that is not supplying power has a state of charge less than the fourth reference value (Yes at Step P12), the corresponding area power supply master 20B outputs switch signals to the respective switchers 6 to select any one of the power generating devices 4 (Step P13). The area power supply master 20B sets output voltage of the conversion on the charger 5B (Step P14), and instructs the charger 5B to charge the area battery 22 (Step P15). The area power supply master 20B connects the charge circuit thereto (Step P16). For example, the area power supply master 20B connects to the charger 5B by switching the power supply switching unit 26. The area power supply master 20B then connects a power generation circuit thereto (Step P17). For example, the area power supply master 20B connects to any of the power generating devices 4 by switching the corresponding switcher 6, and ends the processing.

If the area battery 22 that is not supplying power has a state of charge greater than or equal to the fourth reference value at the above-mentioned step P12 (No at Step P12), the corresponding area power supply master 20B determines whether any of the area batteries 22 is subject to charge control (Step P18). If any of the area batteries 22 is subject to charge control (Yes at Step P18), the area power supply master 20B shifts the processing to the above-mentioned step P13, and outputs switch signals to the respective switchers 6 to select any one of the power generating devices 4. If none of the area batteries 22 is subject to charge control (No at Step P18), the area power supply master 20B disconnects the power generating devices 4 therefrom (Step P19), and ends the processing.

As described above, in the vehicle power supply control device 1B according to the second embodiment that performs the sixth exemplary operation, one charger 5B is provided between the area power supply masters 20B and the power generating devices 4. The vehicle power supply control device 1B thus can operate with a reduced number of chargers 5B and therefore with a charging circuit of a reduced size as compared with a case where one charger 5B is provided to each power generating device 4. The vehicle power supply control device 1B therefore makes it possible to improve the routability and effectively utilize spaces of a vehicle area. In the vehicle power supply control device 1B, one charger 5B may be provided between the vehicle power supply master 10 and the power generating devices 3 as is provided between the area power supply masters 20B and the power generating devices 4.

A vehicle power supply control device according to the embodiment is configured to supply, to loads, at least either of power supplied from a master power supply controller and power charged in a subsidiary power storage device of an area power supply controller, thereby being able to stably supply power to loads of a vehicle.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle power supply control device comprising:
an area power supply controller that is connected to a power-consuming load installed on a vehicle and includes a subsidiary power storage device to be charged and discharged, the area power supply controller being configured to supply power charged in the subsidiary power storage device to the load; and
a master power supply controller that is connected to the area power supply controller and includes a main power storage device to be charged and discharged, the master power supply controller being configured to supply power charged in the main power storage device to the area power supply controller, wherein
the area power supply controller supplies, to the load, at least either of the following: power supplied from the master power supply controller, and the power charged in the subsidiary power storage device.

2. The vehicle power supply control device according to claim 1, wherein:
when the master power supply controller is unable to supply power to the area power supply controller, the area power supply controller supplies the power charged in the subsidiary power storage device to the load.

3. The vehicle power supply control device according to claim 1, wherein:
the area power supply controller supplies the power charged in the subsidiary power storage device to the load when the subsidiary power storage device has a value of a state of charge greater than or equal to a set value previously determined, and
the area power supply controller does not supply the power charged in the subsidiary power storage device when the subsidiary power storage device has a value of the state of charge less than the set value.

4. The vehicle power supply control device according to claim 2, wherein:
the area power supply controller supplies the power charged in the subsidiary power storage device to the load when the subsidiary power storage device has a value of a state of charge greater than or equal to a set value previously determined, and
the area power supply controller does not supply the power charged in the subsidiary power storage device when the subsidiary power storage device has a value of the state of charge less than the set value.

5. The vehicle power supply control device according to claim 1, wherein:
the vehicle power supply control device includes a plurality of area power supply controllers, and
the master power supply controller performs control so as to supply power charged in the subsidiary power storage device of a first one of the area power supply controllers to the load connected to a second one of the area power supply controllers.

6. The vehicle power supply control device according to claim 2, wherein:
the vehicle power supply control device includes a plurality of the area power supply controllers, and
the master power supply controller performs control so as to supply power charged in the subsidiary power storage device of a first one of the area power supply controllers to the load connected to a second one of the area power supply controllers.

7. The vehicle power supply control device according to claim 3, wherein:

the vehicle power supply control device includes a plurality of the area power supply controllers, and the master power supply controller performs control so as to supply power charged in the subsidiary power storage device of a first one of the area power supply controllers to the load connected to a second one of the area power supply controllers.

8. The vehicle power supply control device according to claim 5, wherein:

when power charged in the subsidiary power storage device of the second area power supply controller is unable to be supplied to the load connected to the second area power supply controller, the master power supply controller performs control so as to supply power charged in the subsidiary power storage device of the first area power supply controller to the load connected to the second area power supply controller.

9. The vehicle power supply control device according to claim 3, wherein:

on conditions that the master power supply controller is able to supply power to the area power supply controller and that the subsidiary power storage device thereof has a value of the state of charge greater than or equal to the set value, the area power supply controller preferentially supplies the power charged in the subsidiary power storage device thereof to the load.

10. The vehicle power supply control device according to claim 5, wherein:

on conditions that the master power supply controller is able to supply power to the area power supply controller and that the subsidiary power storage device thereof has a value of the state of charge greater than or equal to the set value, the area power supply controller preferentially supplies the power charged in the subsidiary power storage device thereof to the load.

11. The vehicle power supply control device according to claim 8, wherein:

on conditions that the master power supply controller is able to supply power to the area power supply controller and that the subsidiary power storage device thereof has a value of the state of charge greater than or equal to the set value, the area power supply controller preferentially supplies the power charged in the subsidiary power storage device thereof to the load.

12. The vehicle power supply control device according to claim 1, wherein:

the vehicle power supply control device includes a plurality of area power supply controllers, and on condition that a first one of the area power supply controllers has requested charging, the master power supply controller charges the subsidiary power storage device of the first area power supply controller with at least either of the following: power supplied from the master power supply controller, and power charged in the subsidiary power storage device of a second one of the area power supply controllers.

13. The vehicle power supply control device according to claim 2, wherein:

the vehicle power supply control device includes a plurality of area power supply controllers, and on condition that a first one of the area power supply controllers has requested charging, the master power supply controller charges the subsidiary power storage device of the first area power supply controller with at least either of the following: power supplied from the master power supply controller, and power charged in the subsidiary power storage device of a second one of the area power supply controllers.

14. The vehicle power supply control device according to claim 3, wherein:

the vehicle power supply control device includes a plurality of area power supply controllers, and on condition that a first one of the area power supply controllers has requested charging, the master power supply controller charges the subsidiary power storage device of the first area power supply controller with at least either of the following: power supplied from the master power supply controller, and power charged in the subsidiary power storage device of a second one of the area power supply controllers.

15. The vehicle power supply control device according to claim 5, wherein:

the vehicle power supply control device includes a plurality of area power supply controllers, and on condition that a first one of the area power supply controllers has requested charging, the master power supply controller charges the subsidiary power storage device of the first area power supply controller with at least either of the following: power supplied from the master power supply controller, and power charged in the subsidiary power storage device of a second one of the area power supply controllers.

16. The vehicle power supply control device according to claim 8, wherein:

the vehicle power supply control device includes a plurality of the area power supply controllers, and on condition that a first one of the area power supply controllers has requested charging, the master power supply controller charges the subsidiary power storage device of the first area power supply controller with at least either of the following: power supplied from the master power supply controller, and power charged in the subsidiary power storage device of a second one of the area power supply controllers.

17. The vehicle power supply control device according to claim 9, wherein:

the vehicle power supply control device includes a plurality of area power supply controllers, and on condition that a first one of the area power supply controllers has requested charging, the master power supply controller charges the subsidiary power storage device of the first area power supply controller with at least either of the following: power supplied from the master power supply controller, and power charged in the subsidiary power storage device of a second one of the area power supply controllers.

18. The vehicle power supply control device according to claim 1, wherein:

a power generating device that generates power is connected to the area power supply controller not via the master power supply controller, and the area power supply controller charges the subsidiary power storage device thereof with power generated by the power generating device.

19. The vehicle power supply control device according to claim 2, wherein:

a power generating device that generates power is connected to the area power supply controller not via the master power supply controller, and the area power supply controller charges the subsidiary power storage device thereof with power generated by the power generating device.

20. The vehicle power supply control device according to claim 1, wherein:
the area power supply controller includes
a power controller configured to control power supplied from the master power supply controller and power charged in the subsidiary power storage device, and
a housing in which the subsidiary power storage device and the power controller are accommodated.

21. The vehicle power supply control device according to claim 1, wherein:
the area power supply controller includes a power supply switching unit that switches to a connection state which can supply power between the master power supply controller, the load, and the subsidiary power storage device, or an interruption state which disables a supply of power between the master power supply controller, the load, and the subsidiary power storage device.

22. The vehicle power supply control device according to claim 1, wherein:
the master power supply controller supplies power of the subsidiary power storage device to the main power storage device when a charging rate of the main power storage device decreases.

23. The vehicle power supply control device according to claim 1, wherein:
the area power supply controller is connected to a first power generating device that generates power and a second power generating device that generates power via one charger without passing through the master power supply controller,
a voltage of the power generated by the first power generating device or the second power generating device is converted by the charger and supplied to the subsidiary power storage device.

* * * * *